(12) United States Patent
Kondo et al.

(10) Patent No.: US 8,218,077 B2
(45) Date of Patent: Jul. 10, 2012

(54) IMAGE PROCESSING APPARATUS, IMAGE PROCESSING METHOD, AND PROGRAM

(75) Inventors: Tetsujiro Kondo, Tokyo (JP); Tsutomu Watanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 1217 days.

(21) Appl. No.: 11/697,851

(22) Filed: Apr. 9, 2007

(65) Prior Publication Data
US 2007/0268400 A1    Nov. 22, 2007

(30) Foreign Application Priority Data

May 18, 2006  (JP) ................ 2006-138585

(51) Int. Cl.
| | |
|---|---|
| H04N 7/01 | (2006.01) |
| H04N 11/20 | (2006.01) |
| H04N 5/94 | (2006.01) |
| H04N 9/88 | (2006.01) |
| H04N 5/765 | (2006.01) |
| H04N 5/775 | (2006.01) |
| H04N 7/173 | (2006.01) |
| G06K 9/32 | (2006.01) |
| G06K 9/46 | (2006.01) |

(52) U.S. Cl. ........ 348/458; 348/448; 348/441; 386/264; 386/232; 386/230; 382/299; 382/240; 725/127

(58) Field of Classification Search ............ None
See application file for complete search history.

(56) References Cited

U.S. PATENT DOCUMENTS

| | | | | |
|---|---|---|---|---|
| 6,069,664 A * | 5/2000 | Zhu et al. | ...... | 348/448 |
| 6,104,865 A * | 8/2000 | Hamaguchi et al. | ...... | 386/230 |
| 6,571,142 B1 * | 5/2003 | Kondo et al. | ...... | 700/90 |
| 6,718,073 B1 * | 4/2004 | Kondo et al. | ...... | 382/299 |
| 6,798,458 B1 * | 9/2004 | Unemura | ...... | 348/448 |
| 7,679,676 B2 * | 3/2010 | De Haan | ...... | 348/453 |
| 2002/0118296 A1 * | 8/2002 | Schwab et al. | ...... | 348/441 |
| 2003/0156227 A1 * | 8/2003 | Kondo | ...... | 348/714 |
| 2006/0268169 A1 * | 11/2006 | Han | ...... | 348/458 |
| 2007/0047830 A1 * | 3/2007 | Kondo | ...... | 382/240 |
| 2007/0230914 A1 * | 10/2007 | Garrido et al. | ...... | 386/98 |

FOREIGN PATENT DOCUMENTS

JP    10-56622    2/1998

* cited by examiner

*Primary Examiner* — Jefferey Harold
*Assistant Examiner* — Sean Haiem
(74) *Attorney, Agent, or Firm* — Oblon, Spivak, McClelland, Maier & Neustadt, L.L.P.

(57) ABSTRACT

An image processing apparatus for processing first image data into second image data having a higher quality includes the following elements. A determination unit determines whether broadcast image data is up-converted image data generated by up-converting different image data by increasing the number of pixels forming the different image data. A down-converter down-converts the broadcast image data into down-converted image data by decreasing the number of pixels forming the broadcast image data. A first image converter converts, if the broadcast image data is not the up-converted image data, the first image data into the second image data by using the down-converted image data and the broadcast image data as the first image data. A second image converter converts, if the broadcast image data is the up-converted image data, the first image data into the second image data by using the down-converted image data as the first image data.

10 Claims, 13 Drawing Sheets

IMAGE PROCESSING APPARATUS, IMAGE PROCESSING METHOD, AND PROGRAM

CROSS REFERENCES TO RELATED APPLICATIONS

The present invention contains subject matter related to Japanese Patent Application JP 2006-138585 filed in the Japanese Patent Office on May 18, 2006, the entire contents of which are incorporated herein by reference.

BACKGROUND OF THE INVENTION

1. Field of the Invention

The present invention generally relates to image processing apparatuses, image processing methods, and programs, more particularly, to an image processing apparatus, an image processing method, and a program that enable viewers to receive high-quality image data.

2. Description of the Related Art

In terrestrial analog broadcasting which has hitherto been performed, standard definition (SD) images having an aspect ratio of 4:3 based on National Television System Committee (NTSC) composite signals are broadcast.

In addition to terrestrial analog broadcasting, terrestrial digital broadcasting has recently started. In terrestrial digital broadcasting, high definition (HD) images having an aspect ratio of 16:9 based on component signals are broadcast. Accordingly, by terrestrial digital broadcasting, images having a quality higher than images broadcast by terrestrial analog broadcasting can be provided.

It will take time, however, before broadcasting equipment, such as cameras for capturing HD images having an aspect ratio of 16:9, comes into widespread use since it is expensive.

Accordingly, in some broadcasting stations, only the format of composite-signal images to be broadcast in terrestrial analog broadcasting is adjusted to that of HD images to be broadcast in terrestrial digital broadcasting. More specifically, composite-signal images are first converted into component-signal images, and then, up-conversion is performed for increasing the number of pixels of the component-signal images through interpolation of pixels. Then, the resulting images with the adjusted format are broadcast.

Such HD images generated as described above are referred to as "pseudo-HD images".

Since pseudo-HD images are images generated simply by converting composite images into component images, noise, so-called "cross-color" or "dot interference", occurs in such pseudo-HD images. Additionally, pseudo-HD images are images generated by up-converting the component-signal images converted from the composite-signal images. Accordingly, noise, such as cross-color or dot interference, becomes even more noticeable by the up-conversion operation.

A technique for converting images into high-quality images by taking characteristics unique to composite signals into consideration has been proposed in, for example, Japanese Unexamined Patent Application Publication No. 10-056622.

SUMMARY OF THE INVENTION

If images broadcast by terrestrial digital broadcasting are not real HD images, but pseudo-HD images whose format is the same as that of HD images, it is difficult that viewers (users) receive high-quality images.

It is thus desirable to enable viewers to receive high-quality image data.

According to an embodiment of the present invention, there is provided an image processing apparatus for processing first image data to output second image data having a quality higher than the first image data. The image processing apparatus includes determination means for determining whether broadcast image data is up-converted image data generated by up-converting different image data by increasing the number of pixels forming the different image data, down-conversion means for down-converting the broadcast image data into down-converted image data by decreasing the number of pixels forming the broadcast image data, first image conversion means for converting, if the determination means determines that the broadcast image data is not the up-converted image data, the first image data into the second image data by using the down-converted image data and the broadcast image data as the first image data, and second image conversion means for converting, if the determination means determines that the broadcast image data is the up-converted image data, the first image data into the second image data by using the down-converted image data as the first image data.

The first image conversion means may include first prediction tap extraction means for extracting, as prediction taps, a plurality of pixels used for predicting a subject pixel of the second image data from the broadcast image data, which serves as the first image data, second prediction tap extraction means for extracting, as prediction taps, a plurality of pixels used for predicting the subject pixel of the second image data from the down-converted image data, which serves as the first image data, first class tap extraction means for extracting, as class taps, a plurality of pixels used for classifying the subject pixel into one of a plurality of classes from the broadcast image data, which serves as the first image data, second class tap extraction means for extracting, as class taps, a plurality of pixels used for classifying the subject pixel into one of the plurality of classes, from the down-converted image data, which serves as the first image data, classification means for classifying the subject pixel on the basis of the class taps extracted by the first and second class tap extraction means, coefficient output means for outputting a coefficient associated with the class of the subject pixel from among coefficients, which are obtained beforehand by learning, associated with the plurality of classes, and computation means for computing the subject pixel by conducting prediction computation using the coefficient associated with the class of the subject pixel and the prediction taps extracted by the first and second prediction tap extraction means.

The first image conversion means may further include tap specifying means for specifying the prediction taps extracted by the first and second prediction tap extraction means and the class taps extracted by the first and second class tap extraction means.

According to another embodiment of the present invention, there is provided an image processing method for processing first image data to output second image data having a quality higher than the first image data. The image processing method includes the steps of determining whether broadcast image data is up-converted image data generated by up-converting different image data by increasing the number of pixels forming the different image data, down-converting the broadcast image data into down-converted image data by decreasing the number of pixels forming the broadcast image data, converting, if it is determined that the broadcast image data is not the up-converted image data, the first image data into the second image data by using the down-converted image data and the broadcast image data as the first image data, and converting, if it is determined that the broadcast image data is the up-converted image data, the first image data into the second image data by using the down-converted image data as the first image data.

According to another embodiment of the present invention, there is provided a program allowing a computer to execute image processing for processing first image data to output second image data having a quality higher than the first image data. The image processing includes the steps of determining whether broadcast image data is up-converted image data generated by up-converting different image data by increasing the number of pixels forming the different image data, down-converting the broadcast image data into down-converted image data by decreasing the number of pixels forming the broadcast image data, converting, if it is determined that the broadcast image data is not the up-converted image data, the first image data into the second image data by using the down-converted image data and the broadcast image data as the first image data, and converting, if it is determined that the broadcast image data is the up-converted image data, the first image data into the second image data by using the down-converted image data as the first image data.

According to an embodiment of the present invention, it is determined whether broadcast image data is up-converted image data generated by up-converting different image data by increasing the number of pixels forming the different image data. If it is determined that the broadcast image data is not the up-converted image data, the first image data is converted into the second image data by using down-converted image data generated by down-converting the broadcast image data by decreasing the number of pixels forming the broadcast image data and the broadcast image data as the first image data. If it is determined that the broadcast image data is the up-converted image data, the first image data is converted into the second image data by using the down-converted image data as the first image data.

According to an embodiment of the present invention, viewers can receive high-quality image data.

DESCRIPTION OF THE PREFERRED EMBODIMENTS

Figure 1:
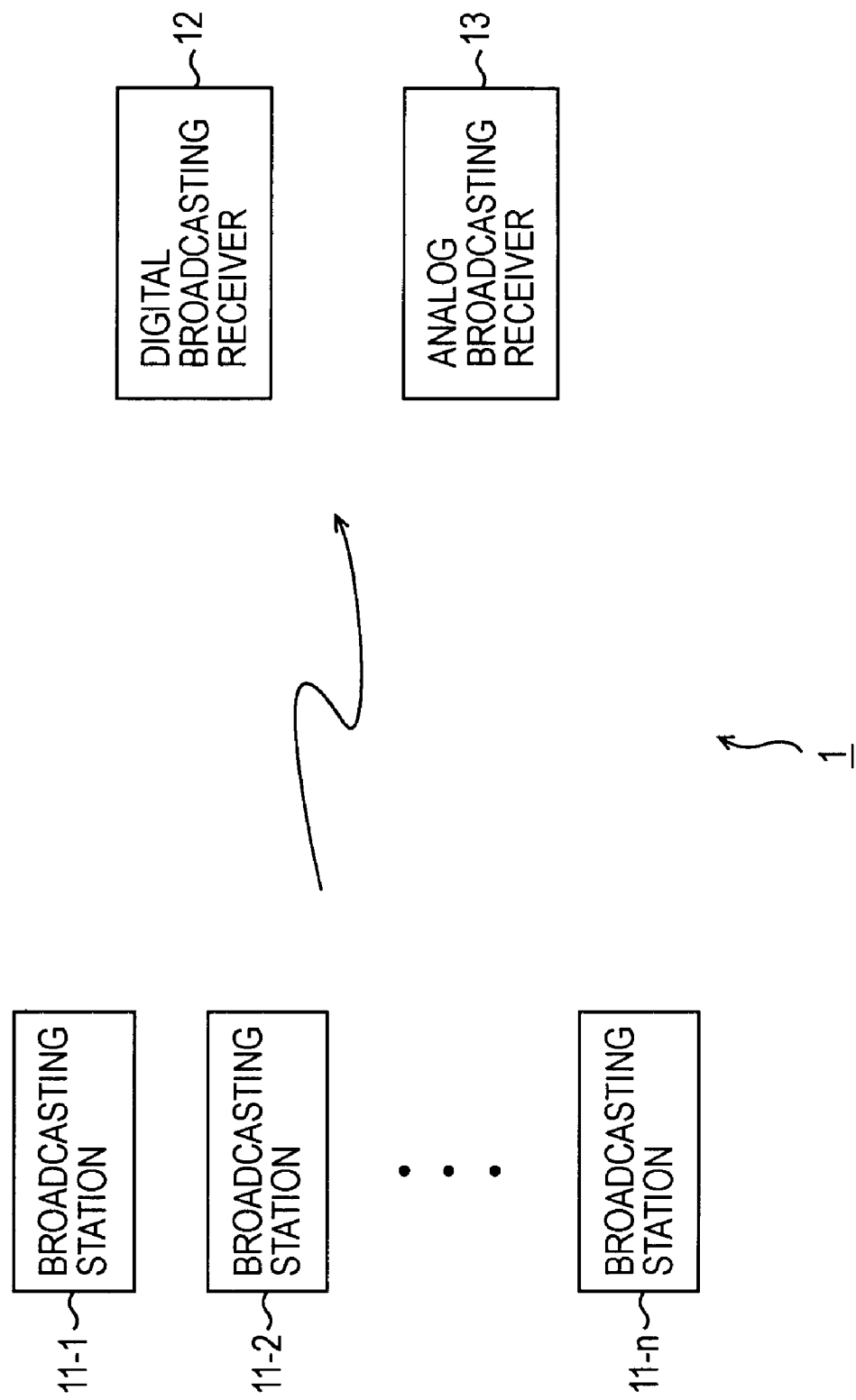
FIG. 1 is a block diagram illustrating the configuration of a broadcasting system to which an embodiment of the present invention is applied.

Before describing an embodiment of the present invention, the correspondence between the features of the claims and the embodiment disclosed in the present invention is discussed below. This description is intended to assure that the embodiment supporting the claimed invention is described in this specification. Thus, even if an element in the following embodiment is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

An image processing apparatus according to an embodiment of the present invention is an image processing apparatus (e.g., a digital broadcasting receiver 12 shown in FIG. 3) for processing first image data to output second image data having a quality higher than the first image data. The image processing apparatus includes determination means (e.g., a determination unit 44 shown in FIG. 3) for determining whether broadcast image data is up-converted image data generated by up-converting different image data by increasing the number of pixels forming the different image data, down-conversion means (e.g., a down-converter 45 shown in FIG. 3) for down-converting the broadcast image data into down-converted image data by decreasing the number of pixels forming the broadcast image data, first image conversion means (e.g., an HD image converter 47 shown in FIG. 3) for converting, if the determination means determines that the broadcast image data is not the up-converted image data, the first image data into the second image data by using the down-converted image data and the broadcast image data as the first image data, and second image conversion means (e.g., an SD image converter 48 shown in FIG. 3) for converting, if the determination means determines that the broadcast image data is the up-converted image data, the first image data into the second image data by using the down-converted image data as the first image data.

The first image conversion means includes first prediction tap extraction means (e.g., a tap extracting unit 61-H shown in FIG. 5) for extracting, as prediction taps, a plurality of pixels used for predicting a subject pixel of the second image data from the broadcast image data, which serves as the first image data, second prediction tap extraction means (e.g., a tap extracting unit 61-S shown in FIG. 5) for extracting, as prediction taps, a plurality of pixels used for predicting the subject pixel of the second image data from the down-converted image data, which serves as the first image data, first class tap extraction means (e.g., a tap extracting unit 62-H shown in FIG. 5) for extracting, as class taps, a plurality of pixels used for classifying the subject pixel into one of a plurality of classes from the broadcast image data, which serves as the first image data, second class tap extraction means (e.g., a tap extracting unit 62-S shown in FIG. 5) for extracting, as class taps, a plurality of pixels used for classifying the subject pixel into one of the plurality of classes, from the down-converted image data, which serves as the first image data, classification means (e.g., a classification unit 64 shown in FIG. 5) for classifying the subject pixel on the basis of the class taps extracted by the first and second class tap extraction means, coefficient output means (e.g., a coefficient memory 65 shown in FIG. 5) for outputting a coefficient associated with the class of the subject pixel from among coefficients, which are obtained beforehand by learning, associated with the plurality of classes, and computation means (e.g., a prediction unit 66 shown in FIG. 5) for computing the subject pixel by conducting prediction computation using the coefficient associated with the class of the subject pixel and the prediction taps extracted by the first and second prediction tap extraction means.

The first image conversion means further includes tap specifying means (e.g., a tap structure memory 63 shown in FIG. 5) for specifying the prediction taps extracted by the first and second prediction tap extraction means and the class taps extracted by the first and second class tap extraction means.

Figure 4:
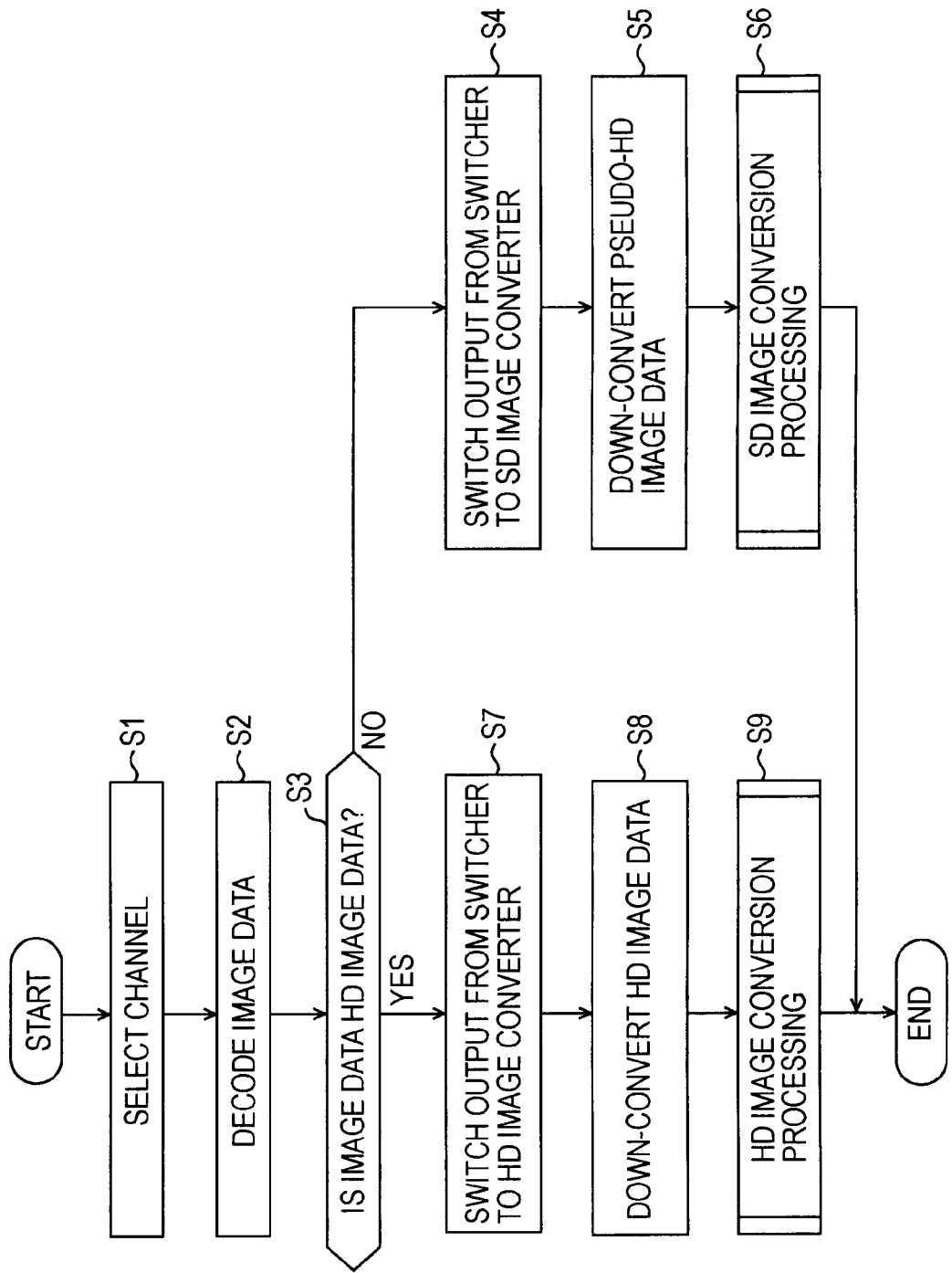
FIG. 4 is a flowchart illustrating reception processing performed by the digital broadcasting receiver.

An image processing method (e.g., an image processing method shown in FIG. 4) and a program according to another embodiment of the present invention include the steps of determining whether broadcast image data is up-converted image data generated by up-converting different image data by increasing the number of pixels forming the different image data (e.g., step S3 in FIG. 4), down-converting the broadcast image data into down-converted image data by decreasing the number of pixels forming the broadcast image data (e.g., step S5 or S8 in FIG. 4), converting, if it is determined that the broadcast image data is not the up-converted image data, the first image data into the second image data by using the down-converted image data and the broadcast image data as the first image data (e.g., step S9 in FIG. 4), and converting, if it is determined that the broadcast image data is the up-converted image data, the first image data into the second image data by using the down-converted image data as the first image data (e.g., step S6 in FIG. 4).

An embodiment of the present invention is described below with reference to the accompanying drawings.

FIG. 1 illustrates the configuration of a broadcasting system 1 to which an embodiment of the present invention is applied. In this specification, the system is a logical set of a plurality of devices, and it is not essential that the devices be in the same housing.

In the broadcasting system 1, broadcasting stations 11-1 through 11-n (n is a positive integer) each broadcast images and sound of the same program by terrestrial analog broadcasting or terrestrial digital broadcasting. The broadcasting stations 11-1 through 11-n are simply referred to as the "broadcasting station 11" unless it is necessary to distinguish the individual broadcasting stations 11-1 through 11-n. Between images and sound of a program to be broadcast by the broadcasting stations 11-1 through 11-n, only images of the program are discussed below.

A digital broadcasting receiver 12 receives images as a program which is broadcast from the broadcasting station 11 by terrestrial digital broadcasting, and displays the received images on a monitor (not shown). An analog broadcasting receiver 13 receives images as a program which is broadcast from the broadcasting station 11 by terrestrial analog broadcasting, and displays the received images on a monitor (not shown).

Figure 2:
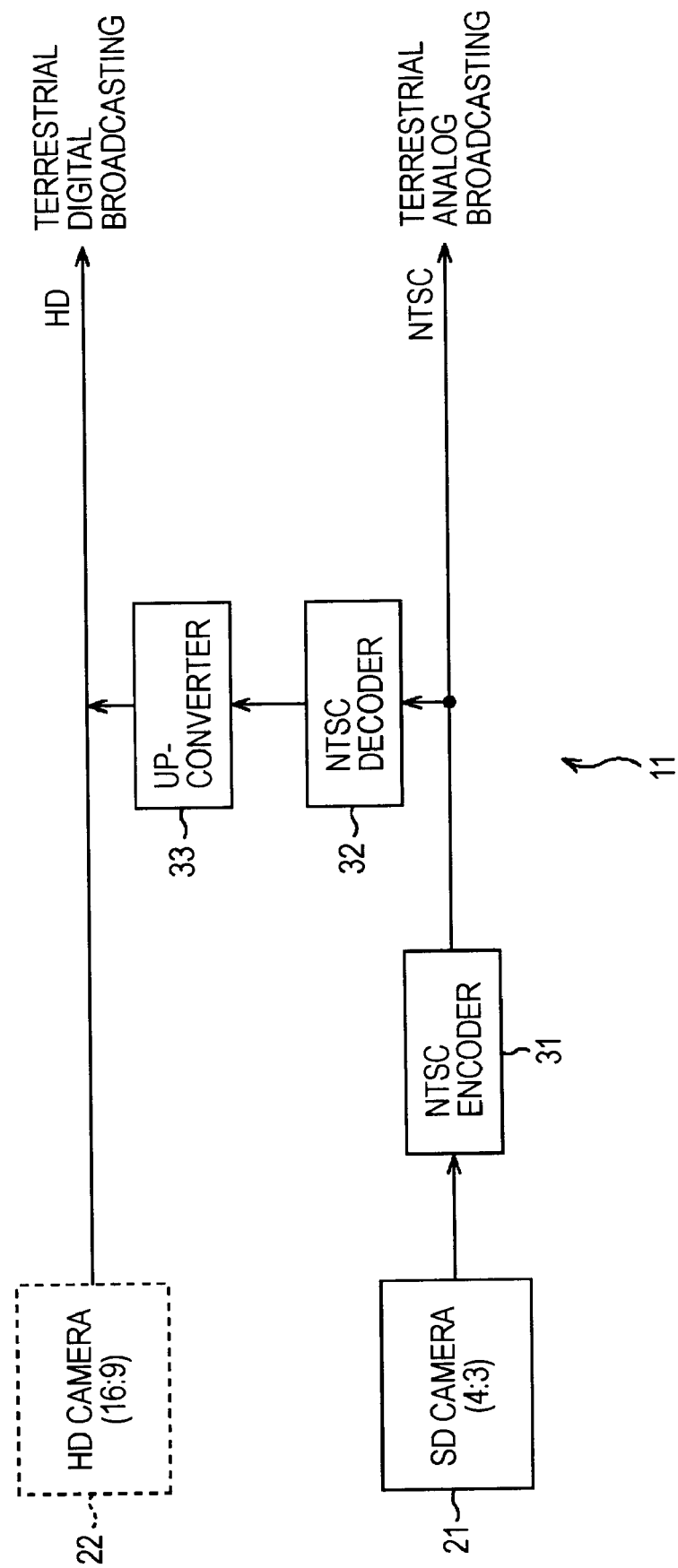
FIG. 2 is a block diagram illustrating an overview of a broadcasting station shown in FIG. 1.

FIG. 2 is a block diagram illustrating an overview of the broadcasting station 11 shown in FIG. 1.

In the broadcasting station 11, component-signal SD images captured by an SD camera 21 are converted (encoded) into NTSC composite signals by an NTSC encoder 31, and are broadcast by terrestrial analog broadcasting.

If an HD camera 22 for capturing HD images, which is indicated by the broken lines in FIG. 2, is installed in the broadcasting station 11, component-signal HD images captured by the HD camera 22 are broadcast in a terrestrial digital broadcasting channel, which serves as a frequency band, allocated to the broadcasting station 11.

If the HD camera 22 is not installed in the broadcasting station 11, in the broadcasting station 11, an NTSC composite signal output from the NTSC encoder 31 is converted into a component signal by an NTSC decoder 32, and the converted component signal is supplied to an up-converter 33. The up-converter 33 up-converts the component-signal image supplied from the NTSC decoder 32 so that the format of the component-signal image becomes the same as that of an HD image output from the HD camera 22. As a result, a pseudo-HD image obtained by capturing a subject image with the SD camera 21 and by then up-converting the captured image so that the format of the up-converted image becomes the same as that of the HD image output from the HD camera 22 is broadcast by terrestrial digital broadcasting.

The broadcasting station 11 performs, for example, Moving Picture Experts Group (MPEG) encoding on image data and then broadcasts the encoded image data by terrestrial digital broadcasting, though such an encoding operation is not shown.

Figure 3:
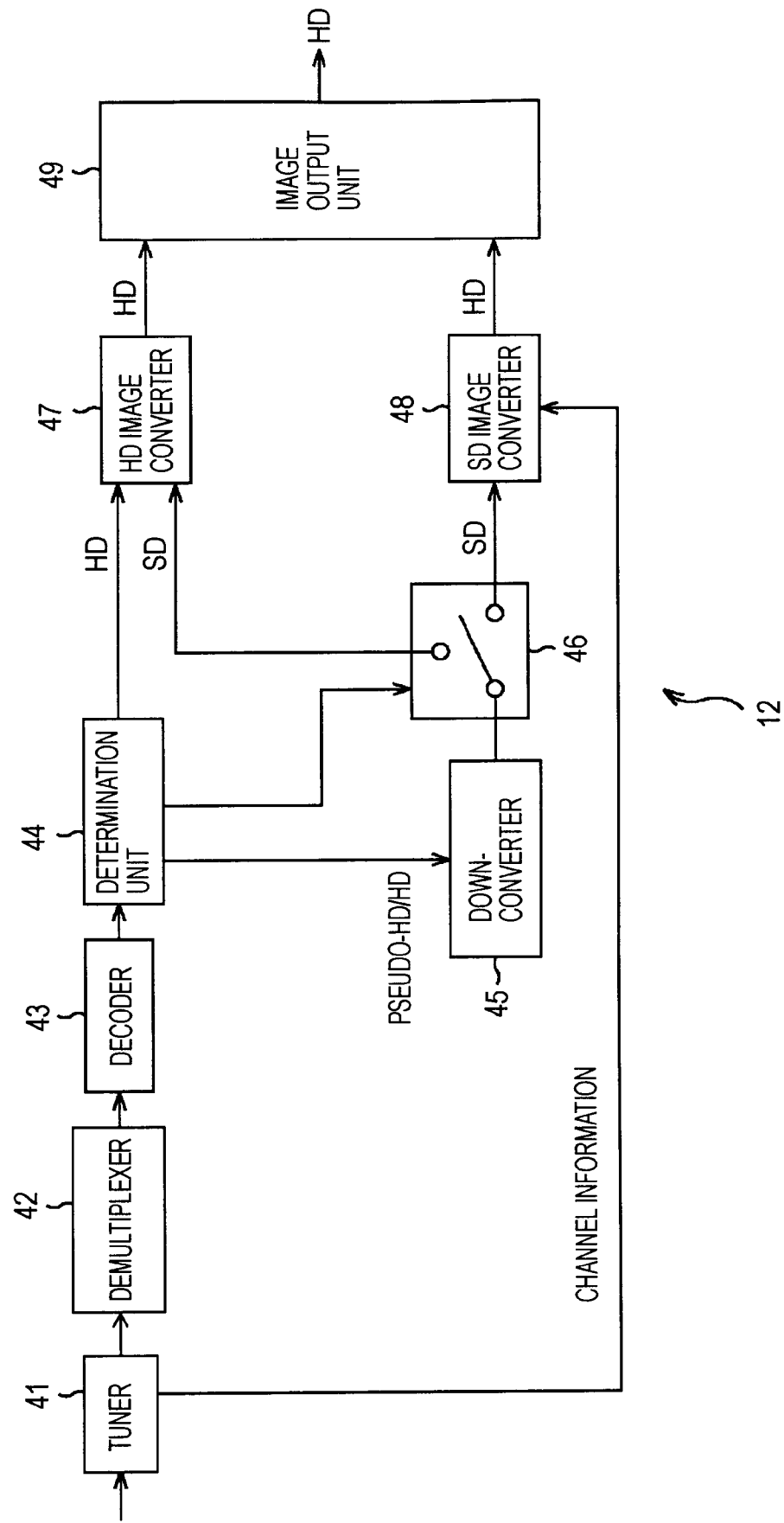
FIG. 3 is a block diagram illustrating the configuration of a digital broadcasting receiver shown in FIG. 1.

FIG. 3 illustrates the configuration of the digital broadcasting receiver 12.

The digital broadcasting receiver 12 includes a tuner 41, a demultiplexer 42, a decoder 43, a determination unit 44, a down-converter 45, a switcher 46, an HD image converter 47, an SD image converter 48, and an image output unit 49.

The tuner 41 receives a terrestrial digital broadcasting signal and extracts, from the signal, a channel signal in response to an operation performed on a remote commander (not shown) by a user who is to view the image output from the digital broadcasting receiver 12, and supplies the extracted channel signal to the demultiplexer 42. The demultiplexer 42 separates necessary packets from the channel signal supplied from the tuner 41, and supplies the packets to the decoder 43. The decoder 43 MPEG-decodes MPEG-encoded image data included in the packets supplied from the demultiplexer 42, and supplies the resulting image data to the determination unit 44.

The determination unit 44 determines the type of image data supplied from the decoder 43, and supplies the image data to the down-converter 45 or the HD image converter 47 depending on the type of data.

More specifically, if the determination unit 44 determines that the image data supplied from the decoder 43 is a pseudo-HD image, which is up-converted image data generated by converting NTSC-composite-signal image data into component-signal image data and by up-converting the component-signal image data by increasing the number of pixels forming the component-signal image data, the determination unit 44 supplies the pseudo-HD image to the down-converter 45.

In contrast, if the determination unit 44 determines that the image data supplied from the decoder 43 is not up-converted image data, but HD image data, the determination unit 44 supplies the HD image data to the down-converter 45 and the HD image converter 47.

The determination unit 44 also controls the switcher 46 according to whether image data supplied from the decoder 43 is pseudo-HD image or HD image data. More specifically, if image data supplied from the decoder 43 is pseudo-HD image, the determination unit 44 controls an output from the switcher 46 to be supplied to the SD image converter 48. If image data supplied from the decoder 43 is HD image data, the determination unit 44 controls an output from the switcher 46 to be supplied to the HD image converter 47.

A determination as to whether image data from the decoder 43 is HD image data or pseudo-HD image can be made on the basis of, for example, the activity, which can be determined as the sum of differences between adjacent pixels. That is, the resolution of HD image data is high, while the resolution of pseudo-HD image is, at the highest, equal to that of image data obtained by converting NTSC-composite-signal image data into component-signal image data. Accordingly, if image data supplied from the decoder 43 has an activity higher than or equal to a certain threshold, it can be determined that the image data is HD image data. Conversely, if image data supplied from the decoder 43 has an activity lower than the certain threshold, it can be determined that the image data is pseudo-HD image data.

Both the HD image data and pseudo-HD image have an aspect ratio of 16:9. However, the pseudo-HD image is landscape image data whose aspect ratio is changed to 16:9 by up-converting a component signal converted from NTSC-composite-signal image data having an aspect ratio of 4:3. Accordingly, in the pseudo-HD image, image data of a single color, such as a black color, is added to the left and right edges of the 4:3 image data. Thus, a determination as to whether the image data supplied from the decoder 43 is HD image data or pseudo-HD image can also be made according to whether single-color image data is present at the left and right edges of the image data from the decoder 43.

The down-converter 45 reduces the number of pixels of the HD image data or pseudo-HD image supplied from the determination unit 44 so that the number of pixels becomes equal to the number of pixels of the component-signal image data output from the NTSC decoder 32 shown in FIG. 2. If necessary, the resulting HD image data or pseudo-HD image is further down-converted by being subjected to low-pass filtering with a low-pass filter (LPF), and the resulting SD image data is then supplied to the switcher 46.

The switcher 46 outputs the SD image data supplied from the down-converter 45 to the HD image converter 47 or the SD image converter 48 under the control of the determination unit 44. If the SD image data supplied from the down-converter 45 is data down-converted from HD image data, the switcher 46 supplies the SD image data to the HD image converter 47. If the SD image data supplied from the down-converter 45 is data down-converted from pseudo-HD image, the switcher 46 supplies the SD image data to the SD image converter 48.

The HD image converter 47 performs image conversion processing for converting the HD image data supplied from the determination unit 44 and the SD image data supplied from the switcher 46 into HD image data having a quality higher than the HD image data supplied from the determination unit 44, and then supplies the higher-quality image data to the image output unit 49.

The SD image converter 48 performs image conversion processing for converting the SD image data supplied from the switcher 46 into higher-quality HD image data, and then supplies the higher-quality HD image data to the image output unit 49.

The image output unit 49 supplies the HD image data output from the HD image converter 47 or the SD image converter 48 onto a monitor, and allows the monitor to display the image corresponding to the HD image data.

Reception processing performed by the digital broadcasting receiver 12 shown in FIG. 3 is described below with reference to the flowchart in FIG. 4.

In step S1, the tuner 41 selects a channel. That is, the tuner 41 receives a terrestrial digital broadcasting signal and extracts from the signal a channel signal in response to an operation performed on a remote commander by a viewer, and then supplies the extracted channel signal to the demultiplexer 42. The demultiplexer 42 then separates necessary packets from the channel signal supplied from the tuner 41 and supplies the separated packets to the decoder 43.

In step S2, the decoder 43 decodes the image data. That is, the decoder 43 MPEG-decodes MPEG encoded image data included in the packets supplied from the demultiplexer 42, and then supplies the resulting image data to the determination unit 44.

In step S3, the determination unit 44 determines whether the image data supplied from the decoder 43 is HD image data, and supplies the image data to the down-converter 45 or the HD image converter 47 depending on the determination result.

If the determination unit 44 determines in step S3 that the image data supplied from the decoder 43 is not HD image, but pseudo-HD image, it supplies the pseudo-HD image to the down-converter 45.

In step S4, the determination unit 44 switches the output from the switcher 46 to the SD image converter 48. Then, in step S5, the down-converter 45 down-converts the pseudo-HD image supplied from the determination unit 44. Since the switcher 46 has already been switched in step S4 so that data input into the switcher 46 is output to the SD converter 48, the SD image data supplied from the down-converter 45 is supplied to the SD image converter 48.

In step S6, the SD image converter 48 performs SD image conversion processing. More specifically, the SD image converter 48 sets the SD image data supplied from the down-converter 45 via the switch 46 to be first image data, and sets HD image data having a quality higher than the first image data to be second image data. Then, the SD image converter 48 performs image conversion processing for converting the first image data into the second image data. The SD image converter 48 then supplies the higher-quality image data to the image output unit 49, and the image output unit 49 supplies the image corresponding to the HD image data from the SD image converter 48 to a monitor and allows the monitor to display the image.

Channel information indicating a currently received channel, i.e., channel information including metadata of a channel that broadcasts the pseudo-HD image data which is up-converted from the SD image data supplied from the down-converter 45 to the SD image converter 48, is supplied to the SD image converter 48 from the tuner 41. The SD image converter 48 then performs SD image conversion processing for converting the SD image data supplied from the down-converter 45 to HD image data. Details of the SD image conversion processing in step S6 are discussed below with reference to FIGS. 7 and 8.

If it is determined in step S3 that the image data supplied from the decoder 43 is HD image data, the determination unit 44 supplies the HD image data to the down-converter 45 and the HD image converter 47.

Then, in step S7, the determination unit 44 switches an output from the switcher 46 to the HD image converter 47. In step S8, the down-converter 45 down-converts the HD image data supplied from the determination unit 44. Since the switcher 46 has already been switched to the HD image converter 47 in step S7 so that an output from the switcher 46 is output to the HD image converter 47, the SD image data supplied from the down-converter 45 is supplied to the HD image converter 47.

In step S9, the HD image converter 47 performs HD image conversion processing. More specifically, the HD image converter 47 converts the HD image data supplied from the determination unit 44 and the SD image data supplied from the down-converter 45 via the switch 46, which serve as first image data, into HD image data, which serves as second image data, having a quality higher than the HD image data supplied from the determination unit 44. Then, the HD image converter 47 supplies the converted HD image data to the image output unit 49. The image output unit 49 supplies the image corresponding to the HD image data from the HD image converter 47 to a monitor and allows the monitor to display the image.

Details of the HD image conversion processing performed by the HD image converter 47 in step S9 are discussed below with reference to FIGS. 5 and 6.

The HD image converter 47 performs image conversion processing for converting first image data input into the HD image converter 47 into second image data having a quality higher than the first image data. According to the image conversion processing, various processing operations can be implemented depending on how the first and second image data are defined.

If the second image data is high-resolution image data and the first image data is low-resolution image data generated by decreasing the resolution of the second image data, the image conversion processing serves as resolution enhancing processing. If the second image data is high signal-to-noise (S/N)-ratio image data and the first image data is low S/N-ratio image data generated by decreasing the S/N ratio of the second image data, the image conversion processing serves as noise suppression processing. If the second image data is HD image data and the first image data is SD image data generated by decreasing the number of pixels and the resolution of the second image data, the image conversion processing serves as processing for converting an SD image into an HD image.

As stated above, the HD image converter 47 sets the HD image data and the SD image data supplied from the determination unit 44 and the down-converter 45, respectively, to be first image data, and also sets higher-quality HD image data to be second image data, and then performs image conversion processing for converting the first image data into the second image data.

Figure 5:
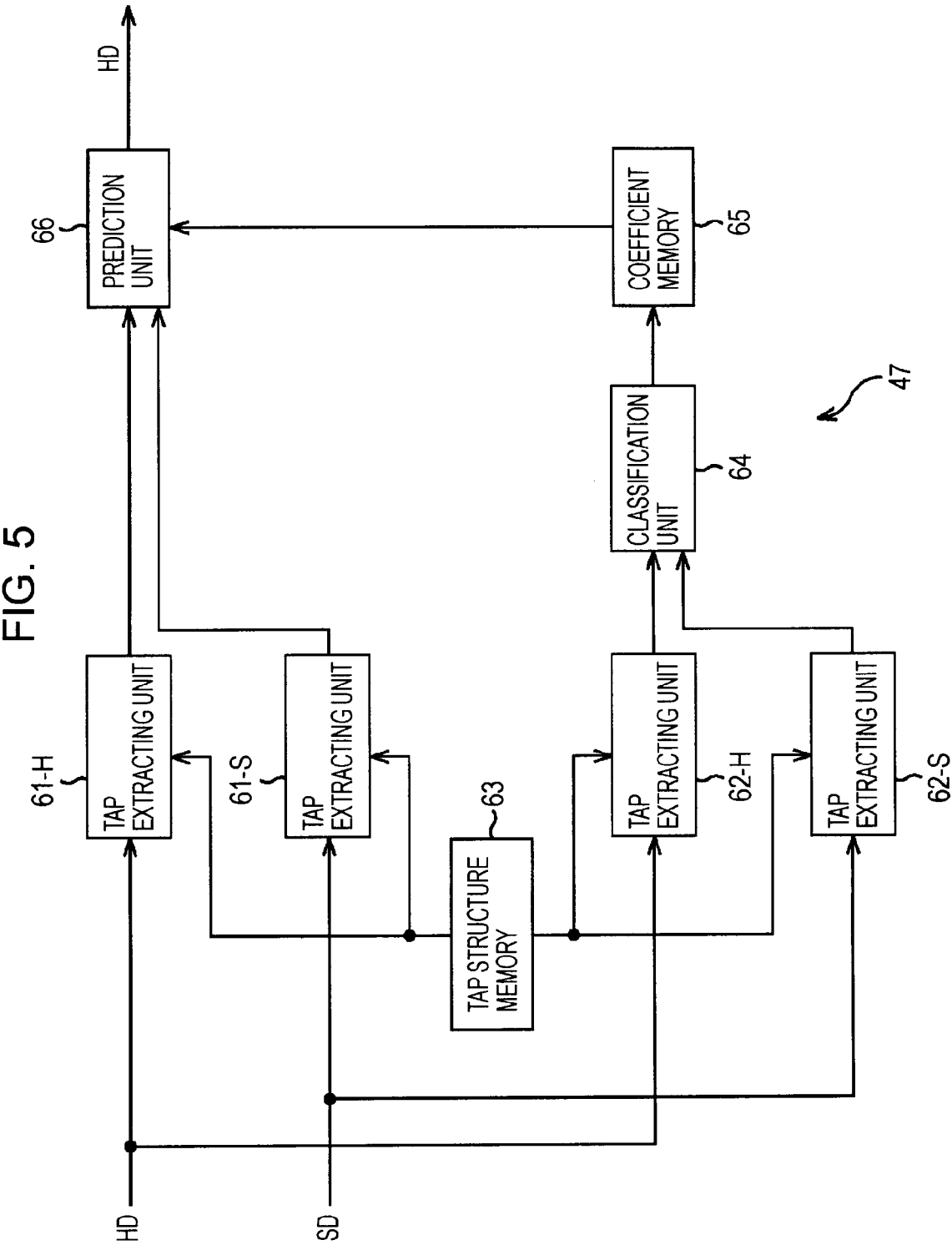
FIG. 5 is a block diagram illustrating the configuration of an HD image converter.
Figure 6:
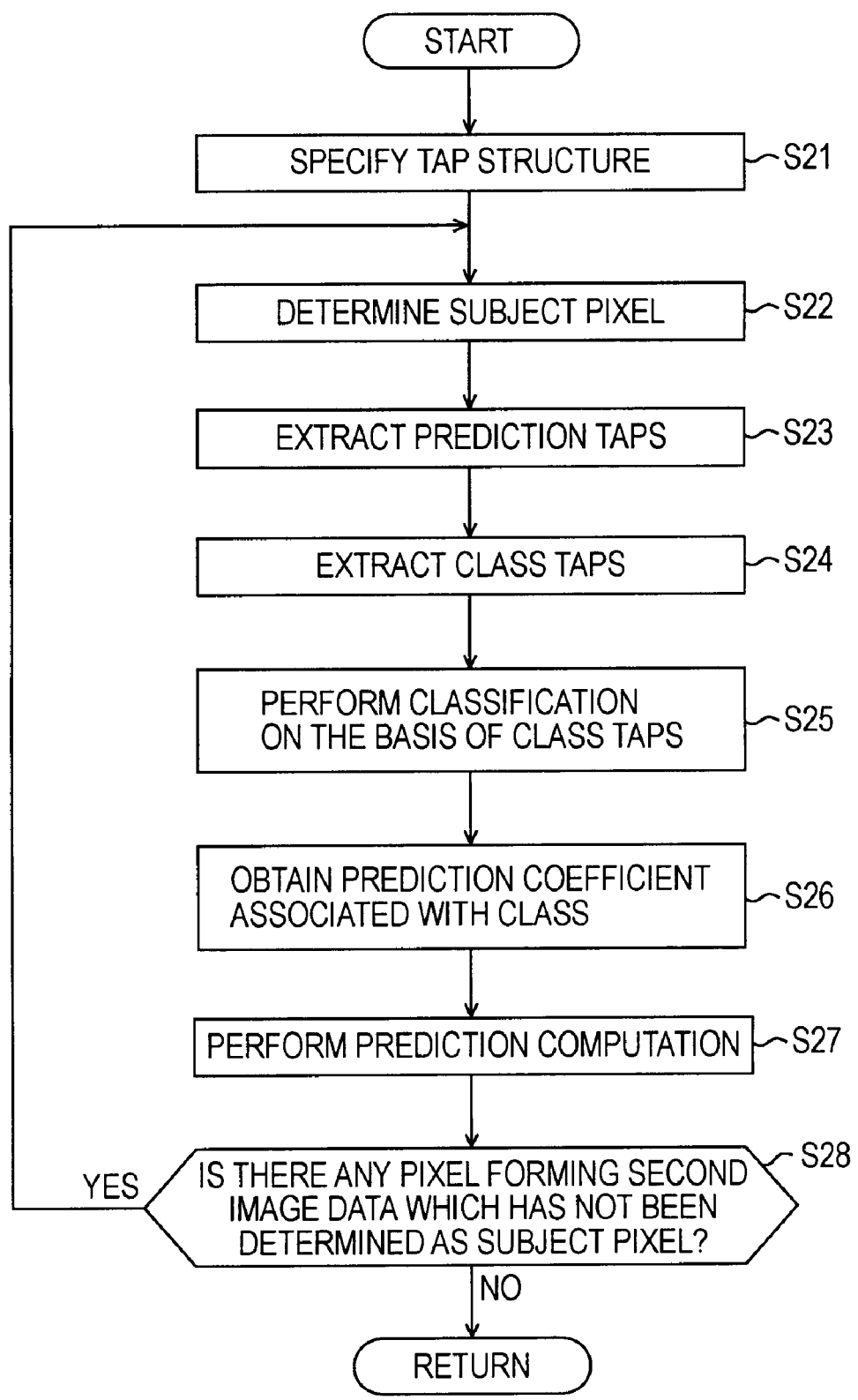
FIG. 6 is a flowchart illustrating HD image conversion processing performed by the HD image converter.

FIG. 5 illustrates the functional configuration of the HD image converter 47.

The HD image converter 47 includes tap extracting units 61-H and 61-S, tap extracting units 62-H and 62-S, a tap structure memory 63, a classification unit 64, a coefficient memory 65, and a prediction unit 66.

The HD image data output from the determination unit 44 and the SD image data output from the down-converter 45 are supplied to the HD image converter 47. More specifically, the HD image data is supplied to the tap extracting units 61-H and 62-H, while the SD image data is supplied to the tap extracting units 61-S and 62-S.

The tap extracting units 61-H and 61-S each sequentially set, as subject pixels, pixels forming HD image data, which serves as second image data, to be converted from the first image data, and also extract, as prediction taps, some pixels forming the first image data used for predicting the pixel value of each subject pixel. Since HD image data, which serves as the second image data, is not yet determined at this stage, it is assumed in a virtual manner.

More specifically, the tap extracting unit 61-H extracts, as prediction taps for a subject pixel, a plurality of pixels forming the HD image data output from the determination unit 44 as the first image data. The pixels to be extracted as prediction taps are determined by addresses supplied from the tap structure memory 63.

Similarly, the tap extracting unit 61-S extracts, as prediction taps for a subject pixel, a plurality of pixels forming the SD image data output from the down-converter 45 as the first image data. The pixels to be extracted as prediction taps are also determined by addresses supplied from the tap structure memory 63.

The tap extracting unit 62-H extracts, as class taps used for classifying the subject pixels into some classes, some pixels forming the HD image data output from the determination unit 44 as the first image data.

The tap extracting unit 62-S extracts, as class taps used for classifying the subject pixels into some classes, some pixels forming the SD image data output from the down-converter 45 as the first image data.

The pixels to be extracted as class taps in the tap extracting units 62-H and 62-S are also determined by addresses supplied from the tap structure memory 63, as in the tap extracting units 61-H and 61-S.

The prediction taps obtained by the tap extracting units 61-H and 61-S are supplied to the prediction unit 66, while the class taps obtained by the tap extracting units 62-H and 62-S are supplied to the classification unit 64.

The tap structure memory 63 specifies the tap structures of the above-described prediction taps and class taps. More specifically, the tap structure memory 63 supplies addresses indicating the positions of pixels for determining prediction taps to the tap extracting units 61-H and 61-S, and also supplies addresses indicating the positions of pixels for determining class taps to the tap extracting unit 62-H and 62-S. The addresses supplied from the tap structure memory 63 indicate the positions of pixels relative to the subject pixel. Alternatively, they may be addresses representing the absolute positions of pixels in all the pixels forming the image.

In this embodiment, for the sake of simplicity, the addresses supplied from the tap structure memory 63 to the tap extracting units 61-H and 61-S and the addresses supplied from the tap structure memory 63 to the tap extracting units 62-H and 62-S, respectively, are equal to each other. That is, the prediction taps and the class taps have the same tap structure. However, they may have different tap structures.

The classification unit 64 classifies the subject pixels on the basis of the class taps supplied from the tap extracting units 62-H and 62-S, and supplies the class codes associated with the resulting classes to the coefficient memory 65.

As a method for performing classification, adaptive dynamic range coding (ADRC) may be employed.

In the ADRC processing, the pixel values of pixels forming class taps are subjected to ADRC processing, and the class of a subject pixel is determined according to the resulting ADRC code.

In K-bit ADRC processing, the maximum value MAX and the minimum value MIN of the pixel values of the pixels forming class taps are detected, and DR=MAX−MIN is set as the local dynamic range of a set of the pixels forming the class taps, and then, the pixel values of the pixels forming the class taps are re-quantized into K bits based on the dynamic range. That is, the minimum value MIN is subtracted from the pixel value of each pixel forming the class taps and the resulting value is divided (quantized) by $DR/2^K$. Then, the K-bit pixel values of the pixels forming the class taps are arranged in a predetermined order, resulting in a bit string, which is then output as the ADRC code. Accordingly, if one-bit ADRC processing is performed on the class taps, the minimum value MIN is first subtracted from the pixel value of each pixel forming the class taps, and then, the resulting pixel value is divided by ½ the difference between the maximum value MAX and the minimum value MIN (decimal places are omitted) so that it is re-quantized into one bit (binarized). That is, the pixel value of each pixel is binarized. Then, a bit string of the one-bit pixel values arranged in a predetermined order is output as the ADRC code.

Instead of performing, for example, ADRC processing, the distribution pattern of the levels of the pixel values of pixels forming class taps may be output as a class code from the classification unit 64. In this case, however, if the class taps are formed of N pixels and K bits are assigned to the pixel value of each pixel, the number of class codes output from the classification unit 64 becomes $(2^N)^K$, which is an enormous number exponentially proportional to the bit number K.

Accordingly, it is preferable that the amount of information indicating class taps be compressed by the above-described ADRC processing or vector quantization to perform classification processing in the classification unit 64.

The coefficient memory 65 stores a set of prediction coefficients for each class, which is predetermined by learning by a learning device 101, which is discussed below with reference to FIG. 9, and outputs the prediction coefficient stored at the address associated with a class code supplied from the classification unit 64, i.e., the prediction coefficient for the class represented by the class code supplied from the classification unit 64.

The prediction unit 66 obtains the prediction taps output from the tap extraction units 61-H and 61-S and the prediction coefficient output from the coefficient memory 65, and performs predetermined prediction computation for determining the prediction value of the true value of the subject pixel by using the prediction taps and the prediction coefficient. Then, the prediction unit 66 determines and outputs the predicted pixel value of the subject pixel, i.e., the pixel value of the pixel forming the second image data.

The prediction computation performed by the prediction unit 66 shown in FIG. 5 is as follows.

It is now assumed that the following image conversion processing is performed. High-quality image data is set to be second image data and low-quality image data generated by decreasing the image quality (e.g., resolution) of the second image data by performing low-pass filtering on the high-quality image data with an LPF is set to be first image data, and then, prediction taps are extracted from the low-quality image data. Then, the pixel values of the pixels forming the high-quality image data (such pixel values are sometimes referred to as "high-quality pixels") are predicted by using the prediction taps and a prediction coefficient according to predetermined prediction computation.

If, for example, linear prediction computation is employed as the predetermined prediction computation, the pixel value y of a high-quality pixel can be determined by the following linear equation (1):

$$y = \sum_{n=1}^{N} w_n x_n \quad (1)$$

where $x_n$ represents the pixel value of the n-th pixel of the low-quality image data (hereinafter sometimes simply referred to as a "low-quality pixel") forming the prediction taps for the high-quality pixel having the pixel value y, and $w_n$ designates the n-th prediction coefficient to be multiplied by the pixel value of the n-th low-quality pixel. It should be noted that the prediction taps are formed of N low-quality pixels $x_1$, $x_2$, ..., and $x_N$ in equation (1).

The pixel value y of the high-quality pixel may be determined from a higher-order expression instead of the linear expression represented by equation (1).

If the true value of the pixel value of the k-sample high-quality pixel is represented by $y_k$ and the prediction value of the true value $y_k$ obtained by equation (1) is represented by $y_k'$, the prediction error $e_k$ can be expressed by the following equation (2).

$$e_k = y_k - y_k' \quad (2)$$

The prediction value $y_k'$ in equation (2) can be obtained by equation (1). Accordingly, if equation (1) is substituted into equation (2), the following equation (3) can be found:

$$e_k = y_k - \left( \sum_{n=1}^{N} w_n x_{n,k} \right) \quad (3)$$

where $x_{n,k}$ designates the n-th low-quality pixel forming the prediction taps for the k-sample high-quality pixel.

The prediction coefficient $w_n$ that reduces the prediction error $e_k$ in equation (3) or (2) to 0 or statistically minimizes the prediction error $e_k$ is the optimal prediction coefficient $w_n$ for predicting the high-quality pixel. Generally, however, it is difficult to obtain such a prediction coefficient $w_n$ for all high-quality pixels.

If, for example, the method of least squares, is employed as the standard for representing that the prediction coefficient $w_n$ is optimal, the optimal prediction coefficient $w_n$ can be obtained by minimizing the total error E of square errors expressed by the following equation (4):

$$E = \sum_{k=1}^{K} e_k^2 \quad (4)$$

where K is the number of samples of sets of the true values $y_k$ of the high-quality pixels and the low-quality pixels $x_{1,k}$, $x_{2,k}$, ..., $x_{N,k}$ forming the prediction taps for the true values $y_k$, i.e., the number of samples for conducting learning.

The minimum (minimal) value of the total error E of the square errors in equation (4) can be given by the prediction coefficient $w_n$ that allows the value obtained by partially differentiating the total error E with respect to the prediction coefficient $w_n$ to be 0, as expressed by equation (5).

$$\frac{\partial E}{\partial w_n} = e_1 \frac{\partial e_1}{\partial w_n} + e_2 \frac{\partial e_2}{\partial w_n} + \ldots + e_K \frac{\partial e_K}{\partial w_n} = 0 \quad (5)$$

$(n = 1, 2, \ldots, N)$

If equation (3) is partially differentiated with respect to the prediction coefficient $w_n$, the following equation (6) can be found.

$$\frac{\partial e_k}{\partial w_1} = x_{1,k}, \frac{\partial e_k}{\partial w_2} \quad (6)$$

$$= -x_{2,k}, \ldots, \frac{\partial e_k}{\partial w_N}$$

$$= -x_{N,k}, (k = 1, 2, \ldots, K)$$

The following equation can be found from equations (5) and (6).

$$\sum_{k=1}^{K} e_k x_{1,k} = 0, \sum_{k=1}^{K} e_k x_{2,k} = 0, \ldots \sum_{k=1}^{K} e_k x_{N,k} = 0 \quad (7)$$

By substituting equation (3) into $e_k$ in equation (7), equation (7) can be represented by normal equations, as expressed by equation (8).

$$\begin{bmatrix} \left(\sum_{k=1}^{K} x_{1,k}x_{1,k}\right) & \left(\sum_{k=1}^{K} x_{1,k}x_{2,k}\right) & \cdots & \left(\sum_{k=1}^{K} x_{1,k}x_{N,k}\right) \\ \left(\sum_{k=1}^{K} x_{2,k}x_{1,k}\right) & \left(\sum_{k=1}^{K} x_{2,k}x_{2,k}\right) & \cdots & \left(\sum_{k=1}^{K} x_{2,k}x_{N,k}\right) \\ \vdots & \vdots & \ddots & \vdots \\ \left(\sum_{k=1}^{K} x_{N,k}x_{1,k}\right) & \left(\sum_{k=1}^{K} x_{N,k}x_{2,k}\right) & \cdots & \left(\sum_{k=1}^{K} x_{N,k}x_{N,k}\right) \end{bmatrix} \begin{bmatrix} w_1 \\ w_2 \\ \vdots \\ w_N \end{bmatrix} = \begin{bmatrix} \left(\sum_{k=1}^{K} x_{1,k}y_k\right) \\ \left(\sum_{k=1}^{K} x_{2,k}y_k\right) \\ \vdots \\ \left(\sum_{k=1}^{K} x_{N,k}y_k\right) \end{bmatrix} \quad (8)$$

The normal equations in equation (8) can be solved with respect to the prediction coefficient $w_n$ by using, for example, a sweeping-out method (Gauss-Jordan elimination method).

By solving the normal equations in equation (8) for each class, the optimal prediction coefficient $w_n$ (in this example, the prediction coefficient that minimizes the total error E of the least squares) can be found for each class.

The HD image converter 47 shown in FIG. 5 computes equation (1) by using the prediction coefficient for each class to convert SD image data and HD image data, which serve as the first image data, into HD image data, which serves as the second image data.

Details of the HD image conversion processing performed by the HD image converter 47 in step S9 in FIG. 4 are discussed below with reference to the flowchart in FIG. 6.

In step S21, the tap structure memory 63 specifies the tap structure of prediction taps and class taps. More specifically, in step S21, the tap structure memory 63 supplies addresses indicating the positions of pixels to be used as prediction taps to the tap extracting units 61-H and 61-S and also supplies addresses indicating the positions of pixels to be used as class taps to the tap extracting units 62-H and 62-S.

In step S22, the tap extracting unit 61-H determines a subject pixel forming the second image data. More specifically, the tap extracting unit 61-H determines one of the pixels forming the HD image data, which serves as the second image data, as a subject pixel, to be converted from the first image data. The tap extracting unit 61-S determines the pixel of the SD image data associated with the subject pixel determined by the tap extracting unit 61-H as a subject pixel used in the tap extracting unit 61-S.

In step S23, the tap extracting units 61-H and 61-S extract prediction taps. More specifically, the tap extracting unit 61-H extracts, as prediction taps for the subject pixel, a plurality of pixels, which are determined by the addresses supplied from the tap structure memory 63, forming the HD image data supplied from the determination unit 44. The tap extracting unit 61-S extracts, as prediction taps for the subject pixel, a plurality of pixels, which are determined by the addresses supplied from the tap structure memory 63, forming the SD image data supplied from the down-converter 45. The extracted prediction taps are supplied to the prediction unit 66.

In step S24, the tap extracting units 62-H and 62-S extract class taps. More specifically, the tap extracting unit 62-H extracts, as class taps for the subject pixel, a plurality of pixels, which are determined by the addresses supplied from the tap structure memory 63, forming the HD image data supplied from the determination unit 44. The tap extracting unit 62-S extracts, as class taps for the subject pixel, a plurality of pixels, which are determined by the addresses supplied from the tap structure memory 63, forming the SD image data supplied from the down-converter 45.

In step S25, the classification unit 64 performs classification on the basis of the class taps supplied from the tap extracting units 62-H and 62-S. The classification unit 64 then outputs the class code representing the resulting class of the subject pixel to the coefficient memory 65.

In step S26, the coefficient memory 65 obtains the prediction coefficient associated with the class code supplied from the classification unit 64, i.e., the prediction coefficient associated with the class of the subject pixel, and then supplies the prediction coefficient to the prediction unit 66. This prediction coefficient has been generated and stored through the learning conducted by the learning device 101 shown in FIG. 9.

In step S27, the prediction unit 66 conducts prediction computation expressed by equation (1) by using the prediction taps supplied from the tap extracting units 61-H and 61-S and the prediction coefficient supplied from the coefficient memory 65 to determine the pixel value of the subject pixel, and then outputs the determined pixel value to the image output unit 49 (FIG. 3).

In step S28, the tap extracting unit 61-H determines whether there is any pixel forming the second image data that has not been determined as a subject pixel. If it is determined in step S28 that there is a pixel that has not been determined as a subject pixel, the process returns to step S22, and steps S22 through S28 are repeated. As a result, one of the pixels forming the second image data that has not been determined as a subject pixel is set to be a new subject pixel and the pixel value of the new subject pixel is determined.

If it is determined in step S28 that there is no pixel forming the second image data that has not been determined as a subject pixel, the processing is completed.

Details of the SD image conversion processing performed by the SD image converter 48 in step S6 in FIG. 4 are discussed below.

As in the HD image converter 47, the SD image converter 48 performs image conversion processing for converting first image data into second image data having a quality higher than the first image data.

As stated above, the SD image converter 48 sets the SD image data supplied from the down-converter 45 via the switcher 46 to be first image data, and sets HD image data having a quality higher than the SD image data to be second image data, and then performs image conversion processing for converting the first image data into the second image data.

Figure 7:
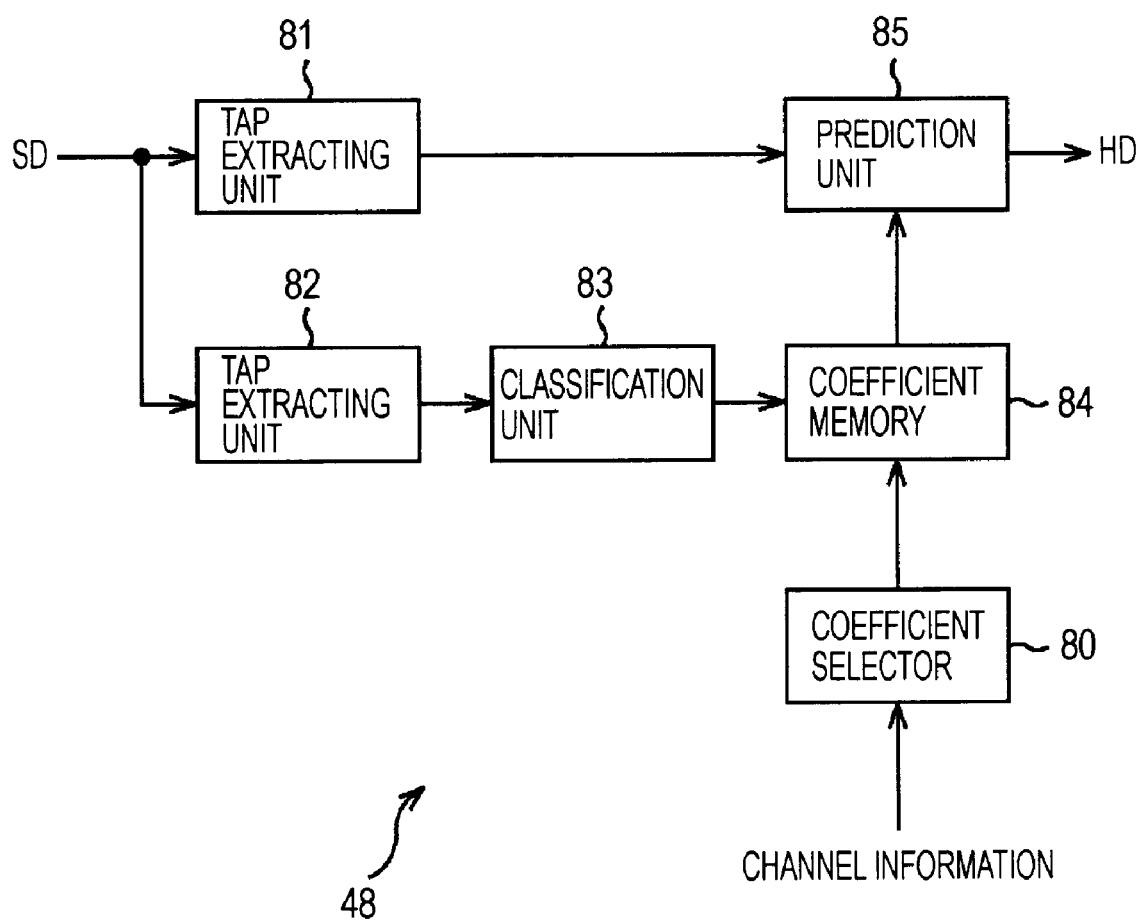
FIG. 7 is a block diagram illustrating the configuration of an SD image converter.

FIG. 7 is a block diagram illustrating the functional configuration of the SD image converter 48.

The SD image converter 48 includes a coefficient selector 80, tap extracting units 81 and 82, a classification unit 83, a coefficient memory 84, and a prediction unit 85.

SD image data output from the down-converter 45 (FIG. 3) is supplied to the SD image converter 48 as the first image data. Channel information indicating the channel of the SD image data output from the down-converter 45, i.e., channel information including metadata of a channel that broadcasts the pseudo-HD image data before being down-converted to the SD image data supplied from the down-converter 45, is also supplied to the SD image converter 48 from the tuner 41 (FIG. 3).

The SD image data, which serves as the first image data, is supplied to the tap extracting units 81 and 82, while the channel information indicating the channel of the SD image data, which serves as the first image data, is supplied to the coefficient selector 80.

The coefficient selector 80 selects one set of prediction coefficients from among a plurality of sets of prediction coefficients stored in the coefficient memory 84 on the basis of the channel information indicating the channel of the SD image data, which serves as the first image data. The coefficient selector 80 then makes the selected set of prediction coefficients effective by means of, for example, switching of a memory bank. More specifically, the coefficient memory 84 reads the prediction coefficient corresponding to information supplied from the classification unit 83 from a certain set of prediction coefficients among a plurality of sets of prediction coefficients stored in the coefficient memory 84, and outputs the read prediction coefficient. The coefficient selector 80 selects the set of prediction coefficients including the prediction coefficient read from the coefficient memory 84. The set of prediction coefficients including the prediction coefficient read from the coefficient memory 84 is sometimes referred to as the "effective set of prediction coefficients".

The tap extracting unit 81 sequentially sets, as subject pixels, pixels forming the HD image data, which serves as the second image data, to be converted from the first image data. The tap extracting unit 81 then extracts, as prediction taps, some pixels forming the first image data used for predicting the pixel value of each subject pixel. As in the above-described HD image converter 47 (FIG. 5), since the HD image data, which serves as the second image data, is not yet determined at this stage, it is assumed in a virtual manner.

More specifically, the tap extracting unit 81 extracts, as prediction taps, a plurality of pixels forming the first image data located spatially or temporally closest to the pixel located at the position in the first image data corresponding to the subject pixel (e.g., the pixel located closest to the position in the first image data corresponding to the subject pixel and pixels located spatially adjacent to the closest pixel).

The tap extracting unit 82 extracts, as class taps, some pixels forming the first image data used for classifying each subject pixel into one of some classes.

As in the HD image converter 47, the prediction taps and the class taps have the same tap structure. However, they may have different tap structures.

The prediction taps extracted by the tap extracting unit 81 are supplied to the prediction unit 85, while the class taps extracted by the tap extracting unit 82 are supplied to the classification unit 83.

In a manner similar to the classification unit 64 of the HD image converter 47 (FIG. 5), the classification unit 83 classifies the subject pixel on the basis of the class taps supplied from the tap extracting unit 82, and supplies the class code associated with the resulting class to the coefficient memory 84.

The coefficient memory 84 stores a set of prediction coefficients for each class that has been determined by learning of a learning device 151, which is discussed below with reference to FIG. 11. The coefficient memory 84 selects the prediction coefficient stored at the address associated with the class code supplied from the classification unit 83, i.e., the prediction coefficient associated with the class represented by the class code supplied from the classification unit 83, from among the stored set of prediction coefficients, and outputs the selected prediction coefficient.

The pseudo-HD image data before being down-converted into the SD image data, which serves as the first image data, to be subjected to the image conversion processing in the SD image converter 48 (such data is sometimes referred to as "pseudo-HD image data corresponding to SD image data) is image data generated by converting composite-signal image data into component-signal image data and by then up-converting the component-signal image data in the broadcasting station 11.

Various techniques can be considered for the above-described up-conversion. For example, image data may be up-converted by interpolating a pixel having the same pixel value as that of a pixel forming the image data, or by interpolating a pixel having a pixel value equal to a weighted average value of a plurality of pixels forming the image data.

Such up-conversion techniques may be different among the broadcasting stations 11.

Accordingly, in the SD image converter 48, the coefficient memory 84 stores a plurality of sets of prediction coefficients corresponding to a plurality of up-conversion techniques so that the SD image data down-converted from pseudo-HD image data can be suitably converted into HD image data regardless of the up-conversion technique for obtaining the pseudo-HD image data.

As stated above, the up-conversion technique may be different among the broadcasting stations 11, i.e., the channels. Accordingly, the coefficient selector 80 selects one set of prediction coefficients from among a plurality of sets of prediction coefficients stored in the coefficient memory 84 on the basis of the channel information indicating the channel of the SD image data, which serves as the first image data. That is, the coefficient selector 80 selects the set of prediction coefficients suitable for image conversion processing to be performed on the SD image data down-converted from the pseudo-image data which is obtained by up-conversion processing employed in the broadcasting station 11 of the channel represented by the channel information, and then makes the selected set of prediction coefficients effective.

The coefficient memory 84 then selects and outputs the prediction coefficient stored at the address associated with the class code supplied from the classification unit 83 from the effective set of prediction coefficients, i.e., the prediction coefficient associated with the class of the subject pixel.

Accordingly, the prediction coefficient output from the coefficient memory 84 is a prediction coefficient suitable for image conversion processing to be performed on the SD image data down-converted from the pseudo-HD image data which is obtained by up-conversion processing employed in the broadcasting station 11 of the channel represented by the channel information.

The prediction unit 85 obtains the prediction taps output from the tap extracting unit 81 and the prediction coefficient output from the coefficient memory 84, and then performs predetermined prediction computation for determining the prediction value of the true value of the subject pixel by using the prediction taps and the prediction coefficient. The prediction unit 85 determines the predicted pixel value of the subject pixel, i.e., the pixel value of the pixel forming the second image data, and then outputs the determined pixel value.

Figure 8:
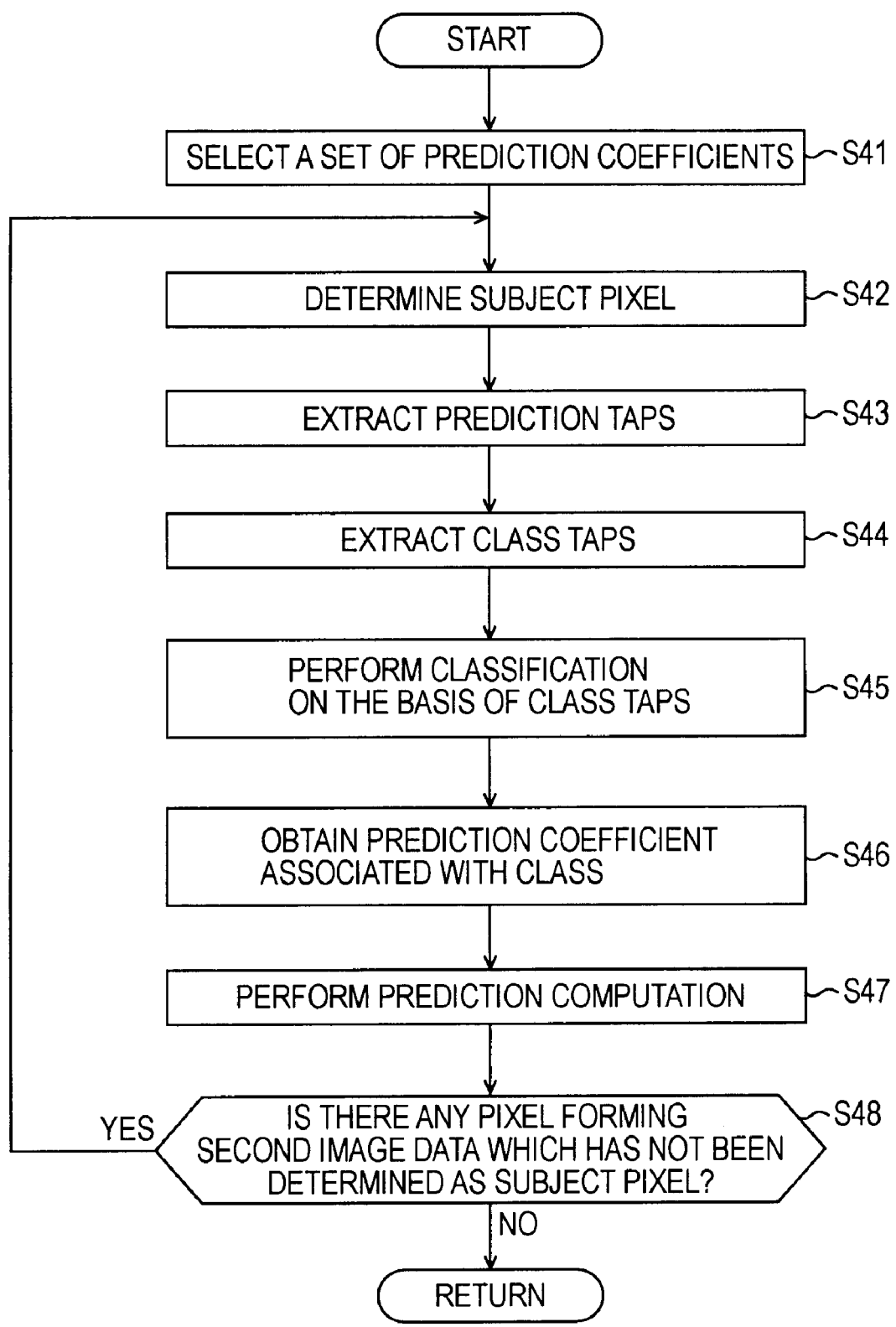
FIG. 8 is a flowchart illustrating SD image conversion processing performed by the SD image converter.

Details of the SD image conversion processing performed by the SD image converter 48 in step S6 in FIG. 4 are discussed below with reference to the flowchart in FIG. 8.

In step S41, from among a plurality of sets of prediction coefficients stored in the coefficient memory 84, the coefficient selector 80 selects, on the basis of the channel information supplied from the tuner 41 (FIG. 3), a set of prediction coefficients suitable for image conversion processing to be performed on the SD image data down-converted from pseudo-image data which is obtained by up-conversion processing employed in the broadcasting station 11 of the channel represented by the channel information, and then makes the selected set of prediction coefficients effective.

Then, in step S42, the tap extracting unit 81 determines a subject pixel from among a plurality of pixels forming the second image data. More specifically, the tap extracting unit 81 determines, as a subject pixel, one of the pixels forming the HD image data, which serves as the second image data, to be converted from the first image data.

In step S43, the tap extracting unit 81 extracts prediction taps. More specifically, the tap extracting unit 81 extracts, as prediction taps for the subject pixel, some pixels forming the SD image data, which serves as the first image data, down-converted from the pseudo-HD image data.

In step S44, the tap extracting unit 82 extracts class taps. More specifically, the tap extracting unit 82 extracts, as class taps for the subject pixel, some pixels forming the SD image data, which serves as the first image data, down-converted from the pseudo-HD image data.

The prediction taps extracted in step S43 are supplied to the prediction unit 85, while the class taps extracted in step S44 are supplied to the classification unit 83.

In step S45, the classification unit 83 classifies the subject pixel on the basis of the class taps supplied from the tap extracting unit 82. The classification unit 83 also outputs the class code associated with the resulting class of the subject pixel to the coefficient memory 84.

In step S46, the coefficient memory 84 obtains the prediction coefficient associated with the class code supplied from the classification unit 83, i.e., the prediction coefficient associated with the class of the subject pixel, from among the effective set of prediction coefficients selected by the coefficient selector 80, and outputs the obtained prediction coefficient to the prediction unit 85.

Then, in step S47, the prediction unit 85 performs prediction computation expressed by equation (1) by using the prediction taps supplied from the tap extracting unit 81 and the prediction coefficient supplied from the coefficient memory 84 to determine the pixel value of the subject pixel, and supplies the determined pixel value to the image output unit 49 (FIG. 3).

In step S48, the tap extracting unit 81 determines whether there is any pixel forming the second image data that has not been determined as a subject pixel. If it is determined in step S48 that there is a pixel that has not been determined as a subject pixel, the process returns to step S42, and steps S42 through S48 are repeated. As a result, one of the pixels forming the second image data that has not been determined as a subject pixel is set as a new subject pixel and the pixel value of the new subject pixel is determined.

If it is determined in step S48 that there is no pixel forming the second image data that has not been determined as a subject pixel, the processing is completed.

Learning for determining the prediction coefficient $w_n$ to be stored in the coefficient memory 65 of the HD image converter 47 or in the coefficient memory 84 of the SD image converter 48 is as follows. In learning, the prediction coefficient $w_n$ is determined by establishing and solving the normal equations expressed by equation (8) for each class.

Figure 9:
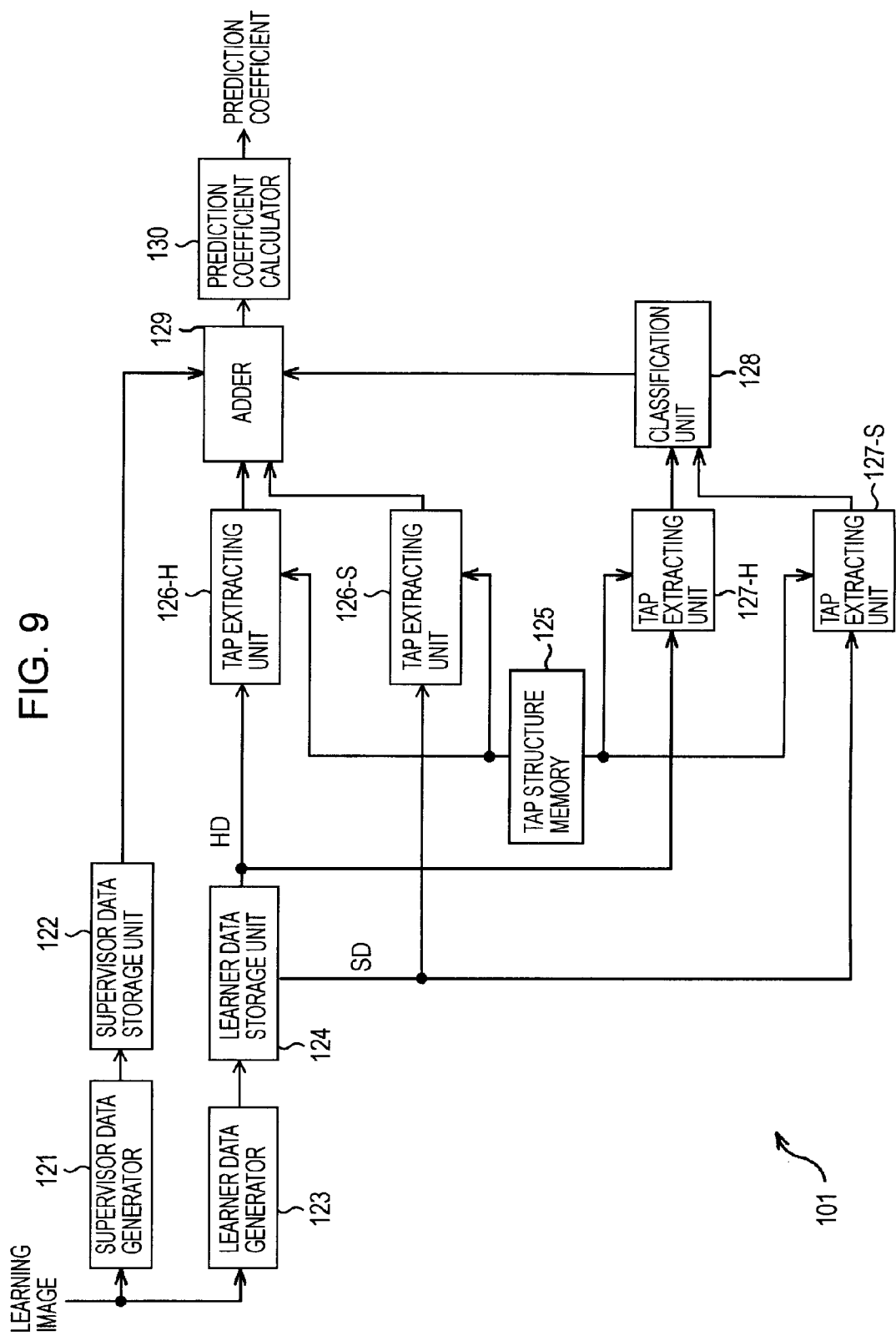
FIG. 9 is a block diagram illustrating the configuration of a learning device for learning prediction coefficients to be stored in the HD image converter.

FIG. 9 is a block diagram illustrating the configuration of the learning device 101 for determining the prediction coefficient $w_n$ to be stored in the coefficient memory 65 of the HD image converter 47.

Image data for learning the prediction coefficient $w_n$ is input into the learning device 101 shown in FIG. 9. As the learning image data, for example, HD image data having a quality higher than HD image data obtained by the HD camera 22 (FIG. 2) can be used.

In the learning device 101, the learning image data is supplied to a supervisor data generator 121 and a learner data generator 123.

The supervisor data generator 121 generates supervisor data corresponding to second image data from the learning image data supplied to the supervisor data generator 121, and supplies the generated supervisor data to a supervisor data storage unit 122. In this example, the supervisor data generator 121 directly supplies HD image data, which serves as the learning image data, to the supervisor data storage unit 122 as the supervisor data.

The supervisor data storage unit 122 stores the HD image data, which serves as the supervisor data, supplied from the supervisor data generator 121.

The learner data generator 123 generates learner data, which serves as the first image data, from the learning image data, and supplies the generated learner data to a learner data storage unit 124.

More specifically, as in the supervisor data generator 121, the learner data generator 123 generates supervisor data from the learning image data (or may receive the supervisor data generated by the supervisor data generator 121), and generates HD image data having a quality lower than the HD image data, which is the supervisor data. The learner data generator 123 also down-converts the low-quality HD image data to generate SD image data having a quality equivalent to the SD image data output from the down-converter 45 (FIG. 3). The learner data generator 123 supplies the low-quality HD image data and the down-converted SD image data to the learner data storage unit 124 as learner data.

The learner data storage unit 124 stores the learner data supplied from the learner data generator 123.

A tap structure memory 125 supplies addresses representing the positions of pixels for determining prediction taps and class taps for a subject pixel to tap extracting units 126-H and 126-S and tap extracting units 127-H and 127-S, respectively.

The tap extracting units 126-H and 126-S and the tap extracting units 127-H and 127-S extract prediction taps and class taps, respectively, on the basis of the addresses, representing the positions of the pixels for the subject pixel, supplied from the tap structure memory 125.

More specifically, the tap extracting unit 126-H sequentially sets the pixels forming the HD image data, which is the supervisor data stored in the supervisor data storage unit 122, to be subject pixels. The tap extracting unit 126-H then extracts, as prediction taps, predetermined pixels from among the pixels forming the low-quality HD image data, which is the learner data stored in the learner data storage unit 124, the prediction taps having the same tap structure as that of the prediction taps extracted by the tap extracting unit 61-H shown in FIG. 5. The tap extracting unit 126-H then supplies the prediction taps to an adder 129.

The tap extracting unit 126-S extracts, as prediction taps, predetermined pixels from among the pixels forming the SD image data, which is the learner data stored in the learner data storage unit 124, the prediction taps having the same structure as the prediction taps extracted by the tap extracting unit 61-S shown in FIG. 5, and then supplies the prediction taps to the adder 129.

The tap extracting unit 127-H extracts, as class taps, predetermined pixels from among the pixels forming the low-quality HD image data, which is the learner data stored in the learner data storage unit 174, the class taps having the same tap structure as the class taps extracted by the tap extracting unit 62-H shown in FIG. 5, and then supplies the class taps to a classification unit 128.

The tap extracting unit 127-S extracts, as class taps, predetermined pixels from among the pixels forming the SD image data, which is the learner data stored in the learner data storage unit 174, the class taps having the same tap structure as the class taps extracted by the tap extracting unit 62-S shown in FIG. 5, and then supplies the class taps to the classification unit 128.

The classification unit 128 performs classification in a manner similar to the classification unit 64 shown in FIG. 5, on the basis of the class taps output from the tap extracting units 127-H and 127-S, and outputs the class code associated with the resulting class to the adder 129.

The adder 129 reads out a subject pixel from the supervisor data storage unit 122, and performs addition processing on the subject pixel and the pixels of the learner data forming the prediction taps supplied from the tap extracting units 126-H and 126-S for the corresponding class code supplied from the classification unit 128.

That is, the pixel value $y_k$ of the subject pixel of the pixels forming the supervisor data stored in the supervisor data storage unit 122, the pixel values $x_{n,k}$ of the pixels of the learner data forming the prediction taps output from the tap extracting units 126-H and 126-S, and the class code representing the class of the subject pixel output from the classification unit 128 are supplied to the adder 129.

The adder 129 executes computation including multiplication of learner data items $(x_{n,k} x_{n',k})$ and the summation (S) in the matrix in the left side in equation (8) by using the prediction taps (learner data) $x_{n,k}$ for each class associated with a class code supplied from the classification unit 128.

The adder 129 also executes computation including multiplication of learner data $x_{n,k}$ and supervisor data $y_k$ $(x_{n,k} y_k)$ and the summation (S) in the vector in the right side in equation (8) by using the prediction taps (learner data) $x_{n,k}$ and supervisor data $y_k$ for each class associated with a class code supplied from the classification unit 128.

In a built-in memory of the adder 129, the component $(sx_{n,k} x_{n',k})$ in the matrix in the left side and the component $(sx_{n,k} y_k)$ in the vector in the right side in equation (8) determined for the previous subject pixel of the supervisor data are stored. The adder 129 adds the corresponding components $x_{n,k+1} x_{n',k+1}$ and $x_{n,k+1} y_{k+1}$, which are calculated by the use of the supervisor data $y_{k+1}$ and the learner data $x_{n,k+1}$, for the new subject pixel of the supervisor data, to the component $(sx_{n,k} x_{n',k})$ in the matrix and the component $(sx_{n,k} y_k)$ in the vector, respectively, i.e., the adder 129 performs addition represented by summation in equation (8).

The adder 129 performs the above-described addition for all the pixels forming the supervisor data stored in the supervisor data storage unit 122 to establish the normal equations expressed by equation (8), and then supplies the normal equations to a prediction coefficient calculator 130.

The prediction coefficient calculator 130 solves the normal equations for each class supplied from the adder 129 to calculate the optimal prediction coefficient $w_n$ for each class.

Figure 10:
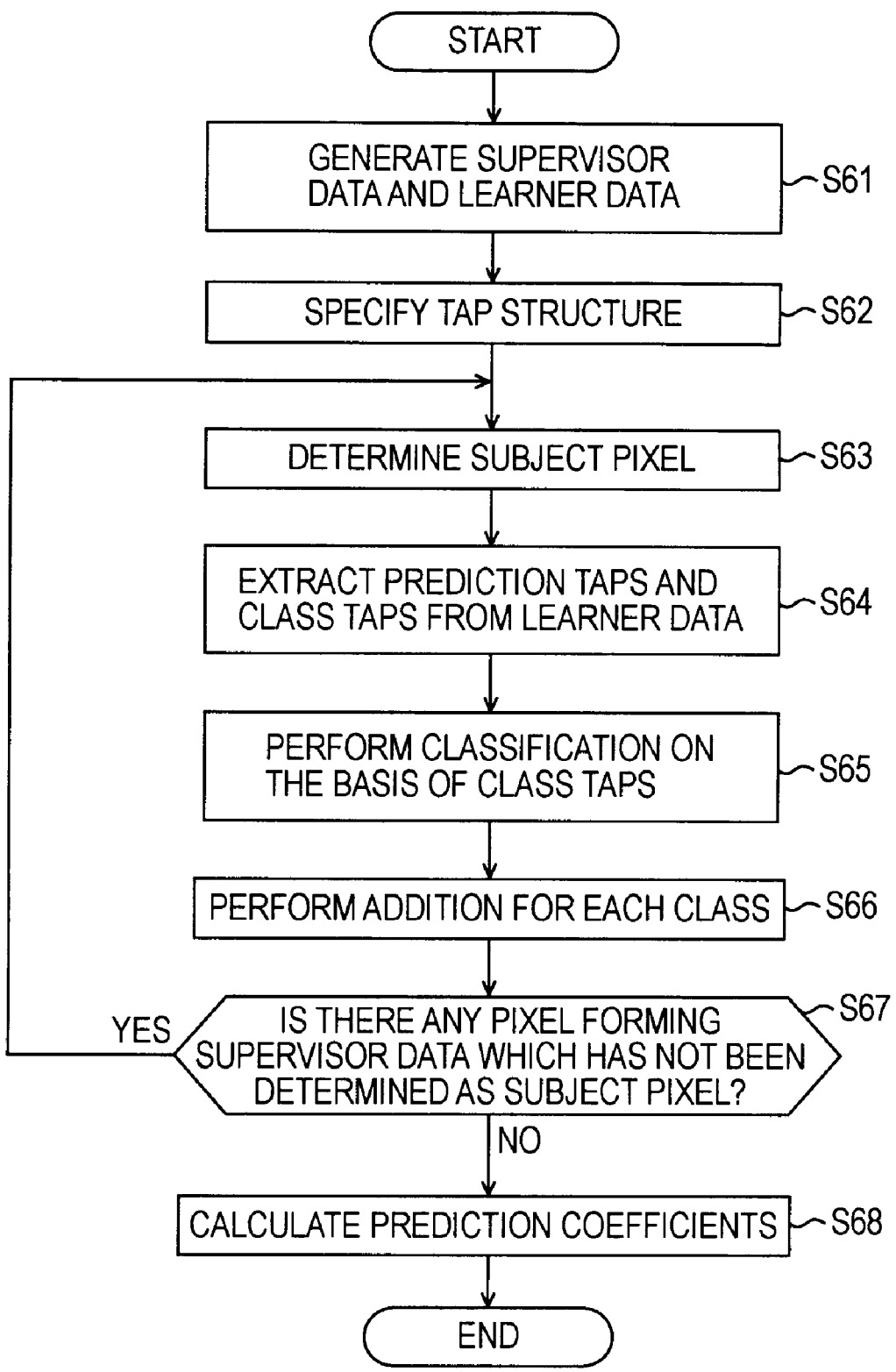
FIG. 10 is a flowchart illustrating learning processing performed by the learning device shown in FIG. 9.

Learning processing performed by the learning device 101 shown in FIG. 9 is described below with reference to the flowchart in FIG. 10.

In step S61, the supervisor data generator 121 and the learner data generator 123 generate supervisor data and learner data, respectively, from learning image data.

More specifically, the supervisor data generator 121 directly outputs learning image data supplied to the supervisor data generator 121, for example, image data having a quality higher than the HD image data obtained by the HD camera 22 (FIG. 2), as supervisor data. The learner data generator 123 generates HD image data having a quality lower than the HD image data, which serves as the supervisor data, and SD image data down-converted from the low-quality HD image data, such as that down-converted by the down-converter 45 (FIG. 3), and outputs the low-quality HD image data and the SD image data as learner data.

The supervisor data output from the supervisor data generator 121 is supplied to and stored in the supervisor data storage unit 122, while the learner data output from the learner data generator 123 is supplied to and stored in the learner data storage unit 124.

Then, in step S62, the tap structure memory 125 specifies the tap structure of prediction taps and class taps. More specifically, in step S62, the tap structure memory 125 supplies addresses indicating the positions of pixels for determining prediction taps to the tap extracting units 126-H and 126-S, and also supplies addresses indicating the positions of pixels for determining class taps to the tap extracting units 127-H and 127-S.

In step S63, the tap extracting unit 126-H determines a subject pixel. That is, the tap extracting unit 126-H determines one of the pixels forming the supervisor data stored in the supervisor data storage unit 122 as a subject pixel.

In step S64, the tap extracting units 126-H and 126-S extract prediction taps from the learner data, while the tap extracting units 127-H and 127-S extract class taps from the learner data. More specifically, the tap extracting units 126-H and 126-S extract the pixels located at the positions specified by the tap structure memory 125 for the subject pixel to obtain, from the learner data, prediction taps having the same tap structure as that of the prediction taps extracted by the tap extracting units 61-H and 61-S shown in FIG. 5, and supplies the prediction taps to the adder 129. The tap extracting units 127-H and 127-S also extract the pixels located at the positions specified by the tap structure memory 125 for the subject pixel to obtain, from the learner data, class taps having the same tap structure as that of the class taps extracted by the tap extracting units 62-H and 62-S shown in FIG. 5, and supplies the class taps to the classification unit 128.

In step S65, the classification unit 128 classifies the subject pixel on the basis of the class taps for the subject pixel supplied from the tap extracting units 127-H and 127-S, and outputs the class code associated with the resulting class to the adder 129.

In step S66, the adder 129 reads the subject pixel from the supervisor data storage unit 122, and performs addition processing expressed by equation (8) on the subject pixel and the pixels of the learner data forming the prediction taps supplied from the tap extracting units 126-H and 126-S for the class associated with the class code supplied from the classification unit 177.

In step S67, the tap extracting unit 126-H determines whether there is any pixel that has not been determined as a subject pixel among the pixels forming the supervisor data stored in the supervisor data storage unit 122. If it is determined in step S67 that there is a pixel that has not been determined as a subject pixel, the process returns to step S63, and a new pixel forming the supervisor data is set to be a new subject pixel, and steps S63 through S67 are repeated.

If it is determined in step S67 that there is no pixel that has not been determined as a subject pixel among the pixels forming the supervisor data, the process proceeds to step S68. In step S68, the adder 129 supplies the computed matrix in the left side and the computed vector in the right side in equation (8) for each class to the prediction coefficient calculator 130.

The prediction coefficient calculator 130 then calculates the prediction coefficients. More specifically, the prediction coefficient calculator 130 solves the normal equations for each class including the matrix in the left side and the vector in the right side expressed by equation (8) supplied from the adder 129 to calculate a set of prediction coefficients $w_n$ for each class.

Due to an insufficient number of learning image data, for some classes, it is difficult to obtain a necessary number of normal equations for determining prediction coefficients. For such classes, the prediction coefficient calculator 130 outputs default prediction coefficients.

In the coefficient memory 65 shown in the HD image converter 47 shown in FIG. 5, a plurality of sets of prediction coefficients $w_n$ for each class determined as described above are stored.

Figure 11:
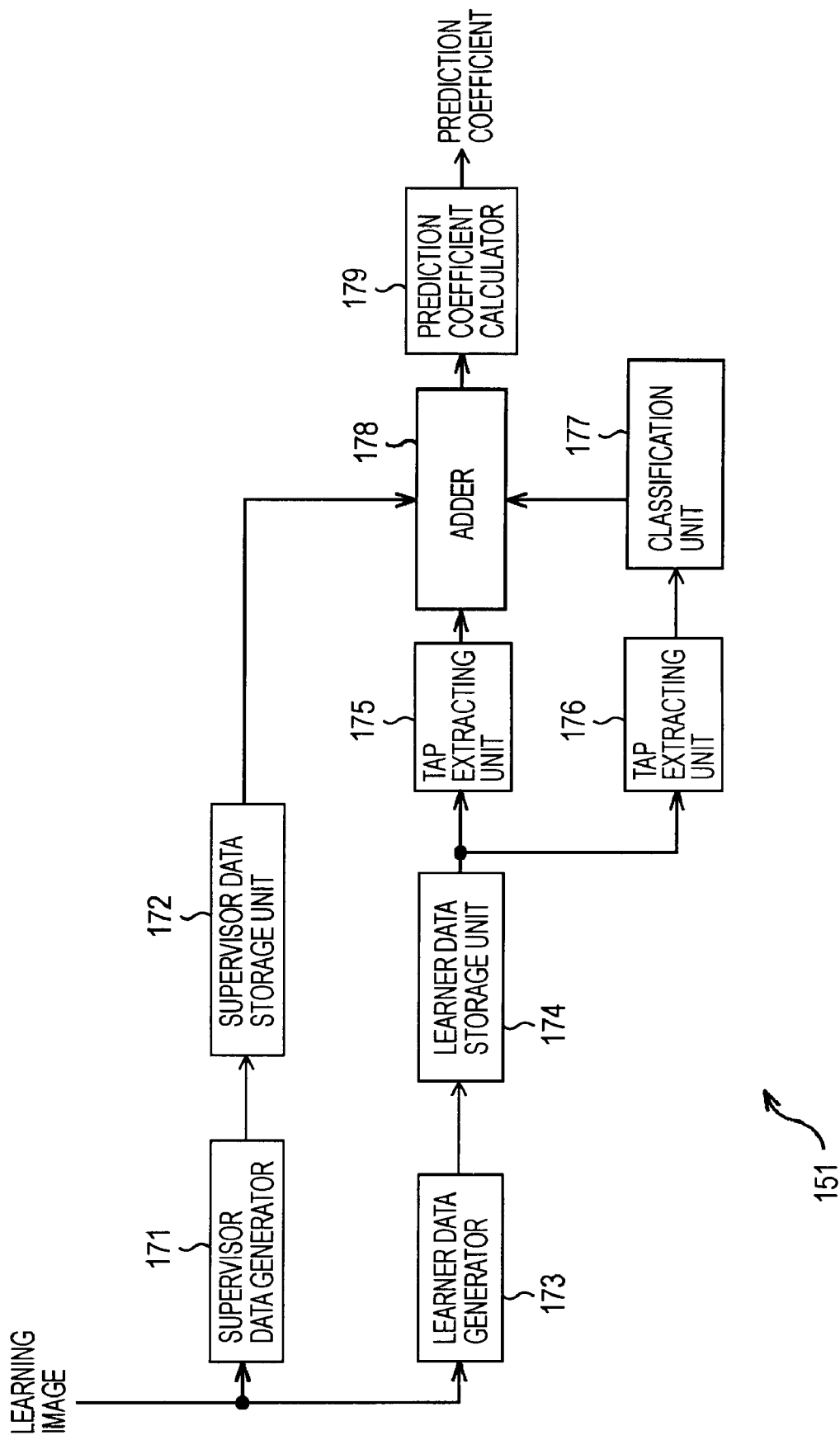
FIG. 11 is a block diagram illustrating the configuration of a learning device for learning prediction coefficients to be stored in the SD image converter.

FIG. 11 illustrates the configuration of the learning device 151 for determining prediction coefficients $w_n$ to be stored in the coefficient memory 84 of the SD image converter 48.

As in the learning device 101, learning image data used for learning prediction coefficients $w_n$ is input into the learning device 151. As the learning image data, HD image data obtained by, for example, the HD camera 22 (FIG. 2), or HD image data having a quality higher than the HD image data, can be used.

In the learning device 151, the learning image data is supplied to a supervisor data generator 171 and a learner data generator 173.

The supervisor data generator 171 generates supervisor data, which is image data corresponding to second image data, from the learning image data supplied to the supervisor data generator 171, and supplies the generated supervisor data to a supervisor data storage unit 172. In this example, the supervisor data generator 171 directly supplies the learning image data, which is the HD image data, to the supervisor data storage unit 172 as the supervisor data.

The supervisor data storage unit 172 stores the HD image data supplied from the supervisor data generator 171 as the supervisor data.

The learner data generator 173 generates learner data, which is the image data corresponding to first image data, from the learning image data, and supplies the generated learner data to a learner data storage unit 174.

More specifically, as in the supervisor data generator 171, the learner data generator 173 generates supervisor data from the learning image data (or may receive the supervisor data generated by the supervisor data generator 171), and also down-converts the HD image data as the supervisor data to generate component-signal SD image data having a quality equivalent to the SD image data output from the SD camera 21 (FIG. 2). In a manner similar to the broadcasting station 11 (FIG. 2), the learner data generator 173 converts the component-signal SD image data into composite SD image data, and then reconverts the composite-signal SD image data into component-signal SD image data, and up-converts the component-signal SD image data to generate pseudo-HD image data. Then, the learner data generator 173 down-converts the generated pseudo-HD image data in a manner similar to the down-converter 45 (FIG. 3), and supplies the resulting SD image data to the learner data storage unit 174 as learner data.

The learner data storage unit 174 stores the learner data supplied from the learner data generator 173.

A tap extracting unit 175 sequentially sets the pixels forming the HD image data as the supervisor data stored in the supervisor data storage unit 172 as subject pixels. The tap extracting unit 175 extracts, as prediction taps for each subject pixel, predetermined pixels among the pixels forming the SD image data, which is the learner data stored in the learner data storage unit 174, the prediction taps having the same tap structure as that of the prediction taps for the subject pixel extracted by the tap extracting unit 81 shown in FIG. 7. The tap extracting unit 175 then supplies the predication taps to an adder 178.

A tap extracting unit 176 extracts, as class taps, predetermined pixels from among the pixels forming the SD image data, which is the learner data stored in the learner data storage unit 174, the class taps having the same tap structure as the class taps for the subject pixel extracted by the tap extracting unit 82 shown in FIG. 7, and then supplies the class taps to a classification unit 177.

The classification unit 177 performs classification in a manner similar to the classification unit 83 shown in FIG. 7, on the basis of the class taps output from the tap extracting unit 176, and then outputs the class code associated with the resulting class to the adder 178.

The adder 178 reads out a subject pixel from the supervisor data storage unit 172, and performs addition processing on the subject pixel and the pixels of the learner data forming the prediction taps supplied from the tap extracting unit 175 for the corresponding class code supplied from the classification unit 177.

That is, the pixel value $y_k$ of the subject pixel of the pixels forming the supervisor data stored in the supervisor data storage unit 172, the pixel values $x_{n,k}$ of the pixels of the learner data forming the prediction taps output from the tap extracting unit 175, and the class code representing the class of the subject pixel output from the classification unit 177 are supplied to the adder 178.

The adder 178 executes computation including multiplication of learner data items ($x_{n,k}x_{n',k}$) and the summation (S) in the matrix in the left side in equation (8) by using the prediction taps (learner data) $x_{n,k}$ for each class associated with a class code supplied from the classification unit 177.

The adder 178 also executes computation including multiplication of learner data $x_{n,k}$ and supervisor data $y_k$ ($x_{n,k}y_k$) and the summation (S) in the vector in the right side in equation (8) by using the prediction taps (learner data) $x_{n,k}$ and supervisor data $y_k$ for each class associated with a class code supplied from the classification unit 177.

In a built-in memory of the adder 178, the component ($sx_{n,k}x_{n',k}$) in the matrix in the left side and the component ($sx_{n,k}y_k$) in the vector in the right side in equation (8) determined for the previous subject pixel of the supervisor data are stored. The adder 178 adds the corresponding components $x_{n,k+1}x_{n',k+1}$ and $x_{n,k+1}y_{k+1}$, which are calculated by the use of the supervisor data $y_{k+1}$ and the learner data $x_{n,k+1}$, for the new subject pixel of the supervisor data, to the component ($sx_{n,k}x_{n',k}$) in the matrix and the component ($sx_{n,k}y_k$) in the vector, respectively, i.e., the adder 178 performs addition represented by summation in equation (8).

The adder 178 performs the above-described addition for all the pixels forming the supervisor data stored in the supervisor data storage unit 172 to establish the normal equations expressed by equation (8), and then supplies the normal equations to a prediction coefficient calculator 179.

The prediction coefficient calculator 179 solves the normal equations for each class supplied from the adder 178 to calculate the optimal prediction coefficient $w_n$ for each class.

Figure 12:
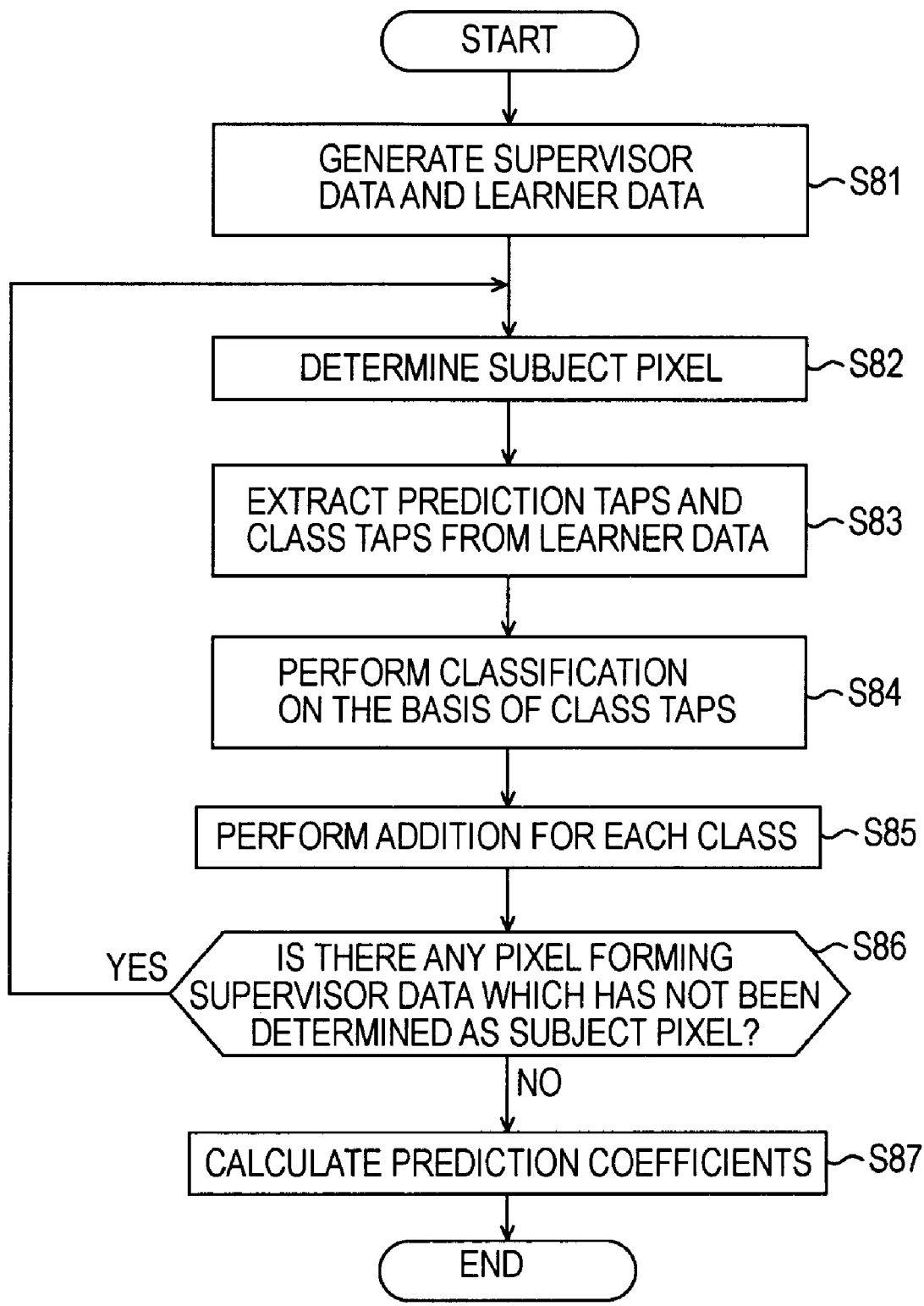
FIG. 12 is a flowchart illustrating learning processing performed by the learning device shown in FIG. 11.

Learning processing performed by the learning device 151 shown in FIG. 11 is described below with reference to the flowchart in FIG. 12.

In step S81, the supervisor data generator 171 and the learner data generator 173 generate supervisor data and learner data, respectively, from learning image data.

More specifically, the supervisor data generator 171 directly outputs, as supervisor data, learning image data supplied to the supervisor data generator 171, for example, image data having a quality higher than or equal to the HD image data obtained by the HD camera 22 (FIG. 2). As in the supervisor data generator 171, the learner data generator 173 generates supervisor data, and then down-converts the HD image data as the supervisor data to generate component-signal SD image data having a quality equal to that of SD image data output from the SD camera 21 (FIG. 2). In a manner similar to the broadcasting station 11, the learner data generator 173 then converts the component-signal SD image data into composite-signal SD image data and then reconverts the composite-signal SD image data into component-signal SD image data, and up-converts the component-signal SD image data to generate pseudo-HD image data. The learner data generator 173 then down-converts the pseudo-HD image data in a manner similar to the down-converter 45 (FIG. 3) and outputs the resulting SD image data as learner data.

The supervisor data output from the supervisor data generator 171 is supplied to and stored in the supervisor data storage unit 172, while the learner data output from the learner data generator 173 is supplied to and stored in the learner data storage unit 174.

Then, in step S82, the tap extracting unit 175 determines a subject pixel. That is, the tap extracting unit 175 determines one of the pixels forming the supervisor data stored in the supervisor data storage unit 172 as a subject pixel.

In step S83, the tap extracting unit 175 extracts prediction taps from the learner data, while the tap extracting unit 176 extracts class taps from the learner data. More specifically, the tap extracting unit 175 extracts, from the learner data, prediction taps for the subject pixel having the same tap structure as that of the prediction taps for the subject pixel extracted by the tap extracting unit 81 shown in FIG. 7, and supplies the prediction taps to the adder 178. The tap extracting unit 176 also extracts, from the learner data, class taps for the subject pixel having the same tap structure as that of the class taps for the subject pixel extracted by the tap extracting unit 82 shown in FIG. 7, and supplies the class taps to the classification unit 177.

In step S84, the classification unit 177 classifies the subject pixel on the basis of the class taps for the subject pixel supplied from the tap extracting unit 176, and outputs the class code associated with the resulting class to the adder 178.

In step S85, the adder 178 reads the subject pixel from the supervisor data storage unit 172, and performs addition processing expressed by equation (8) on the subject pixel and the pixels of the learner data forming the prediction taps supplied from the tap extracting unit 175 for the class associated with the class code supplied from the classification unit 177.

In step S86, the tap extracting unit 175 determines whether there is any pixel that has not been determined as a subject pixel among the pixels forming the supervisor data stored in the supervisor data storage unit 172. If it is determined in step S86 that there is a pixel that has not been determined as a subject pixel, the process returns to step S82, and a new pixel forming the supervisor data is set to be a new subject pixel, and steps S82 through S86 are repeated.

If it is determined in step S86 that there is no pixel that has not been determined as a subject pixel among the pixels forming the supervisor data, the process proceeds to step S87. In step S87, the adder 178 supplies the computed matrix in the left side and the computed vector in the right side in equation (8) for each class to the prediction coefficient calculator 179.

The prediction coefficient calculator 179 then calculates the prediction coefficients. More specifically, the prediction coefficient calculator 179 solves the normal equations for each class including the matrix in the left side and the vector in the right side expressed by equation (8) supplied from the adder 178 to calculate a set of prediction coefficients $w_n$ for each class.

Due to an insufficient number of learning image data, for some classes, it is difficult to obtain a necessary number of normal equations for determining prediction coefficients. For such classes, the prediction coefficient calculator 179 outputs default prediction coefficients.

In the learning device 151, the learner data generator 173 may employ a plurality of up-conversion techniques for obtaining pseudo-HD image data in the process of generating SD image data, which is learner data, to generate learner data corresponding to the plurality of up-conversion techniques. Then, by the use of the plurality of learner data corresponding to the plurality of up-conversion techniques, a plurality of sets of prediction coefficients corresponding to the plurality of up-conversion techniques can be determined.

In the coefficient memory 84 shown in the SD image converter 48 shown in FIG. 7, a plurality of sets of prediction coefficients $w_n$ for each class determined as described above are stored.

As described above, in the digital broadcasting receiver 12 shown in FIG. 3, if the determination unit 44 determines that the type of broadcast image data is pseudo-HD image data, the down-converter 45 down-converts the pseudo-HD image data so that the number of pixels of the pseudo-HD image data is decreased, and then, the SD image converter 48 performs image conversion processing (hereinafter sometimes referred to as "first classification adaptation processing") on the down-converted SD image data by conducting computation using prediction coefficients for each class obtained by learning to convert the down-converted SD image data into high-quality HD image data. With this operation, viewers can receive high-quality image data from the digital broadcasting receiver 12.

As discussed with reference to FIG. 2, pseudo-HD image data is image data generated by converting NTSC-composite-signal image data into component-signal image data and by then up-converting the component-signal image data by increasing the number of pixels of the component-signal image data into the same number of pixels of an HD image captured by the HD camera 22. Accordingly, if the number of pixels forming the component-signal image data converted from the NTSC-composite-signal image data is ⅕ the number of pixels forming the HD image captured by the HD camera 22, the amount of information concerning 5 pixels of the pseudo-HD image data is equal to only one pixel of the component-signal image data converted from the NTSC-composite-signal image data.

Thus, roughly speaking, if the first classification adaptation processing is performed by using the pseudo-HD image data as the first image data, the number of pixels five times as large as that when the first classification adaptation processing is performed by using the component-signal image data converted from the NTSC-composite-signal image data as the first image data should be used for performing computation expressed by equation (1) or classification. Otherwise, it would be difficult to obtain performance comparable to that when the first classification adaptation processing is performed by the use of the component-signal image data converted from the NTSC-composite-signal image data as the first data. The use of many pixels for executing computation expressed by equation (1) or classification increases the processing amount.

Accordingly, as discussed above, the pseudo-HD image data is down-converted by the down-converter 45 to decrease the number of pixels forming the pseudo-HD image data, and then, the first classification adaptation processing is performed by the use of the down-converted SD image data as the first image data in the SD image converter 48. It is thus possible to obtain high-quality image data with a small amount of processing.

Additionally, as shown in FIG. 7, from among a plurality of sets of prediction coefficients associated with a plurality of corresponding up-conversion techniques, one set of prediction coefficients is selected on the basis of channel information concerning the channel of broadcast image data. Then, the first classification adaptation processing is performed by the use of the selected set of prediction coefficients. With this operation, the first classification adaptation processing can be performed by the use of the prediction coefficients suitable for the up-conversion technique employed in the broadcasting station 11 that broadcasts the image data, thereby making it possible to obtain higher-quality image data.

The down-converter 45 is disposed in the digital broadcasting receiver 12, and broadcast pseudo-HD image data is down-converted by the down-converter 45, and then, the resulting SD image data is reconverted into HD image data, so that viewers can receive high-quality image data.

Even if the determination unit 44 determines that broadcast HD image data is HD image data, broadcast HD image data is supplied to the down-converter 45 and is down-converted, and by using the down-converted SD image data and the broadcast HD image data, the HD image converter 47 performs image conversion processing (second classification adaptation processing) by conducting computation using a prediction coefficients for each class obtained by learning. As a result, the HD image data received by the digital broadcasting receiver 12 can be converted into higher-quality HD image data.

That is, by the use of the down-converter 45 for pseudo-HD image data, a larger number of prediction taps and class taps can be used so that higher-quality image data can be obtained. Thus, viewers can receive high-quality image data.

In this case, for the tap structure of prediction taps and class taps for SD image data down-converted from broadcast HD image data, the tap structure memory 63 specifies the same tap structure as that set for broadcast HD image data. Thus, prediction taps and class taps can be expanded with a simple configuration.

In the blocks including the determination unit 44, the down-converter 45, the switcher 46, the HD image converter 47, the SD image converter 48, and the image output unit 49 shown in FIG. 3, not only broadcast image data, but also image data played back from a recording medium can be processed.

A series of processing operations performed by the determination unit 44, the down-converter 45, the switcher 46, the HD image converter 47, and the SD image converter 48 may be executed by hardware or software. If software is used for executing the series of processing operations, a corresponding software program is installed into, for example, a general-purpose computer.

Figure 13:
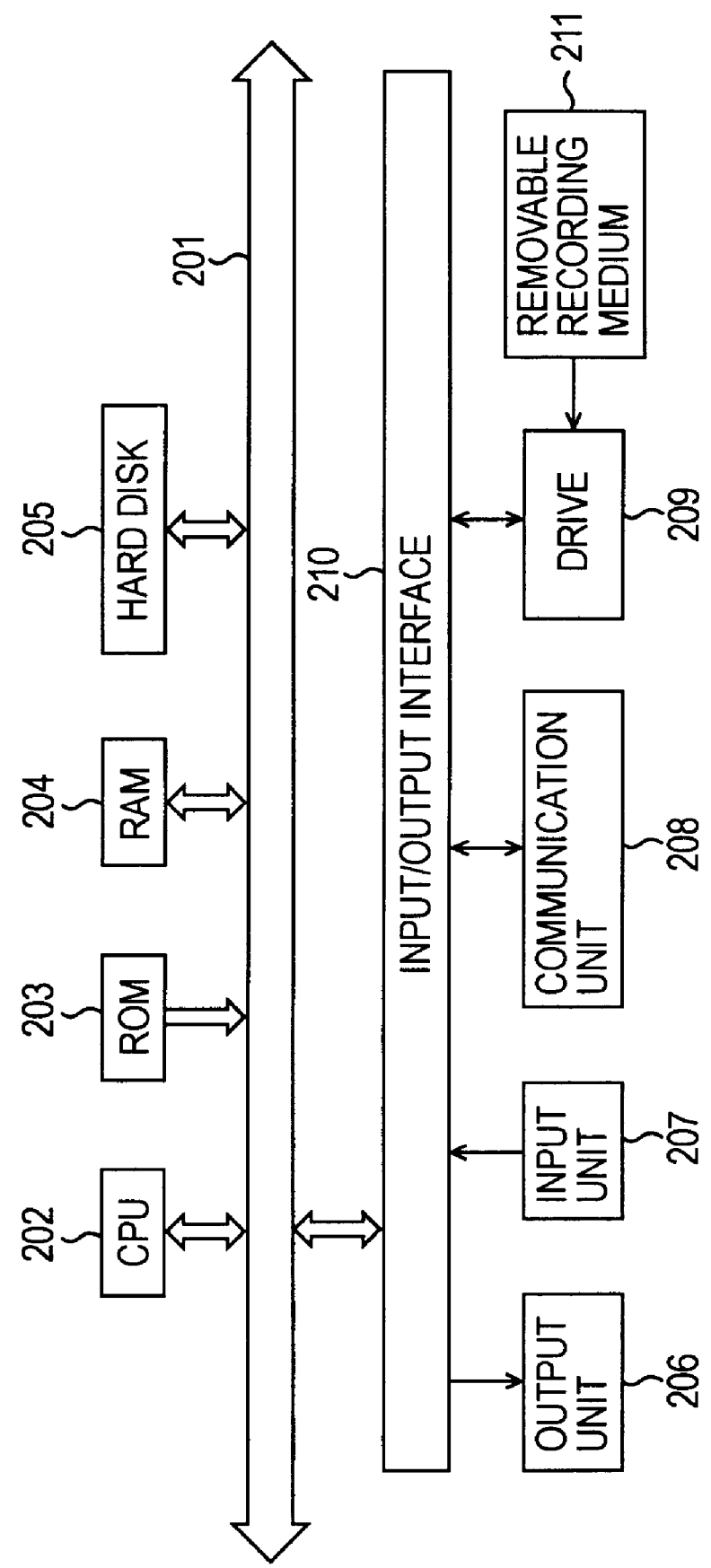
FIG. 13 is a block diagram illustrating the configuration of a computer to which an embodiment of the present invention is applied.

FIG. 13 illustrates the configuration of a computer into which the program executing the above-described series of processing operations is installed.

The program may be pre-recorded on a hard disk 205, which serves as a recording medium built in the computer, or a read only memory (ROM) 203.

Alternatively, the program may be temporarily or permanently stored (recorded) in a removable recording medium 211, such as a flexible disk, a compact disc read only memory (CD-ROM), a magneto-optical (MO) disk, a digital versatile disc (DVD), a magnetic disk, or a semiconductor memory. The removable recording medium 211 can be provided as a so-called "software package".

As stated above, the program may be installed into the computer from the removable recording medium 211. Alternatively, the program may be transferred wirelessly from a download site to the computer via a digital broadcasting artificial satellite or may be transferred to the computer by wired means via a network, such as a local area network (LAN) or the Internet. The computer can receive the transferred program by a communication unit 208 and installs it in the built-in hard disk 205.

The computer has a built-in central processing unit (CPU) 202. An input/output interface 210 is connected to the CPU 202 with a bus 201 therebetween. The CPU 202 executes the program stored in the ROM 203 in response to an instruction input through a user operation performed on an input unit 207 including a keyboard, a mouse, and a microphone via the input/output interface 210. Alternatively, the CPU 202 loads, into a random access memory (RAM) 204, the program stored in the hard disk 205, the program received by the communication unit 208 from a satellite or a network and then installed into the hard disk 205, or the program read from the removable recording medium 211 set in the drive 209 and installed into the hard disk 205, and then executes the program loaded into the RAM 204. Then, the CPU 202 can execute the processing operations indicated by the above-described flowcharts or the processing operations performed in accordance with the configurations shown in the block diagrams. If necessary, the CPU 202 outputs, via the input/output interface 210, a processing result from an output unit 206 including a liquid crystal display (LCD) or a speaker, or sends the processing result through the communication unit 208, or records the processing result on the hard disk 205.

In this specification, steps forming the program allowing a computer to execute various processing operations may be processed in chronological order indicated in the flowcharts. Alternatively, they may be processed in parallel or individually (e.g., parallel processing and object processing).

The program may be processed by a single computer or may be subjected to distribute processing by the use of a plurality of computers.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus for processing first image data to output second image data having a quality higher than the first image data, comprising:

determination means for determining whether received broadcast image data is either previously up-converted pseudo-high definition image data generated by up-converting initial image data by increasing the number of pixels forming the broadcast image data, or is high definition image data that was not up-converted from the initial image data, the pseudo-high definition image data and the high definition image data having a same resolution and format;

down-conversion means for down-converting the received broadcast image data into down-converted image data by decreasing the number of pixels forming the broadcast image data;

a data switch that provides the down-converted image data from the down-conversion means to a first image conversion means for converting when the determination means determines that the broadcast image data is not the up-converted image data, and that provides the down-converted image data to a second image conversion means for converting when the determination means determines that the broadcast image data is the up-converted pseudo-high definition image data;

the first image conversion means converts, when the determination means determines that the broadcast image data is not the up-converted image data, the broadcast image data that was not up-converted from the determination means and the down-converted image data from the down-conversion means as the first image data into the second image data having a resolution higher than the broadcast image data that was not up-converted; and the second image conversion means converts, when the determination means determines that the broadcast image data is the up-converted image data, the down-converted image data from the down-converting means via the data switch as the first image data into the second image data, wherein the determination means provides the broadcast image data to the down-conversion means when it is determined that the broadcast image data is the up-converted pseudo-high definition image data, and provides the broadcast image data to the down-conversion means and the first image conversion means when it is determined that the broadcast image data is not the up-converted image data.

2. The image processing apparatus according to claim 1, wherein the first image conversion means includes first prediction tap extraction means for extracting, as prediction taps, a plurality of pixels used for predicting a subject pixel of the second image data from the broadcast image data, which serves as the first image data, second prediction tap extraction means for extracting, as prediction taps, a plurality of pixels used for predicting the subject pixel of the second image data from the down-converted image data, which serves as the first image data, first class tap extraction means for extracting, as class taps, a plurality of pixels used for classifying the subject pixel into one of a plurality of classes from the broadcast image data, which serves as the first image data, second class tap extraction means for extracting, as class taps, a plurality of pixels used for classifying the subject pixel into one of the plurality of classes, from the down-converted image data, which serves as the first image data, classification means for classifying the subject pixel on the basis of the class taps extracted by the first and second class tap extraction means, coefficient output means for outputting a coefficient associated with the class of the subject pixel from among coefficients, which are obtained beforehand by learning, associated with the plurality of classes, and computation means for computing the subject pixel by conducting prediction computation using the coefficient associated with the class of the subject pixel and the prediction taps extracted by the first and second prediction tap extraction means.

3. The image processing apparatus according to claim 2, wherein the first image conversion means further includes tap specifying means for specifying the prediction taps extracted by the first and second prediction tap extraction means and the class taps extracted by the first and second class tap extraction means.

4. An image processing method for processing first image data to output second image data having a quality higher than the first image data, comprising:

determining, at a determination unit, whether received broadcast image data is either previously up-converted pseudo-high definition image data generated by up-converting initial image data by increasing the number of pixels forming the broadcast image data, or is high definition image data that was not up-converted from the initial image data, the pseudo-high definition image data and the high definition image data having a same resolution and format;

down-converting, at a down-conversion unit, the received broadcast image data into down-converted image data by decreasing the number of pixels forming the broadcast image data;

providing, by a data switch in a first position, the down-converted image data from the down-conversion unit to a first image conversion unit when it is determined that the broadcast image data is not the up-converted image data, and providing, by the data switch in a second position, the down-converted image data to a second image conversion unit when it is determined that the broadcast image data is the up-converted pseudo-high definition image data;

first converting, at the first conversion unit, when said step of determining has determined that the broadcast image data is not the up-converted image data, the broadcast image data that was not up-converted from the determination unit and the down-converted image data from the down-conversion unit as the first image data into the second image data having a resolution higher than the broadcast image data that was not up-converted; and second converting, at the second conversion unit, when said step of determining has determined that the broadcast image data is the up-converted image data, the down-converted image data from the down-conversion unit as the first image data into the second image data, wherein the determination unit provides the broadcast image data to the down-conversion unit when it is determined that the broadcast image data is the up-converted pseudo-high definition image data, and provides the broadcast image data to the down-conversion unit and the first image conversion unit when it is determined that the broadcast image data is not the up-converted image data.

5. A non-transitory computer readable medium having computer instructions recorded thereon, the computer instructions allowing a computer to execute an image processing method for processing first image data to output second image data having a quality higher than the first image data, the method comprising the steps of:

determining, at a determination unit, whether received broadcast image data is either previously up-converted pseudo-high definition image data generated by up-converting initial image data by increasing the number of pixels forming the broadcast image data, or is high definition image data that was not up-converted from the initial image data, the pseudo-high definition image data and the high definition image data having a same resolution and format;

down-converting, at a down-conversion unit, the received broadcast image data into down-converted image data by decreasing the number of pixels forming the broadcast image data;

providing, by a data switch in a first position, the down-converted image data from the down-conversion unit to a first image conversion unit when it is determined that the broadcast image data is not the up-converted image data, and providing, by the data switch in a second position, the down-converted image data to a second image conversion unit when it is determined that the broadcast image data is the up-converted pseudo-high definition image data;

first converting, at the first conversion unit, when said step of determining has determined that the broadcast image data is not the up-converted image data, the broadcast image data that was not up-converted from the determination unit and the down-converted image data from the down-conversion unit as the first image data into the second image data having a resolution higher than the broadcast image data that was not up-converted; and second converting, at the second conversion unit, when said step of determining has determined that the broadcast image data is the up-converted image data, the down-converted image data from the down-conversion unit as the first image data into the second image data, wherein the determination unit provides the broadcast image data to the down-conversion unit when it is determined that the broadcast image data is the up-converted pseudo-high definition image data, and provides the broadcast image data to the down-conversion unit and the first image conversion unit when it is determined that the broadcast image data is not the up-converted image data.

6. An image processing apparatus for processing first image data to output second image data having a quality higher than the first image data, comprising:

a determination unit configured to determine whether received broadcast image data is either previously up-converted pseudo-high definition image data generated by up-converting initial image data by increasing the number of pixels forming the broadcast image data, or is high definition image data that was not up-converted from the initial image data, the pseudo-high definition image data and the high definition image data having a same resolution and format;

a down-converter configured to down-convert the received broadcast image data into down-converted image data by decreasing the number of pixels forming the broadcast image data;

a data switch that provides the down-converted image data from the down-converter to a first image converter when the determination unit determines that the broadcast image data is not the up--converted image data, and that provides the down-converted image data to a second image converter when the determination unit determines that the broadcast image data is the up-converted pseudo-high definition image data;

the first image converter being configured to convert, when the determination unit determines that the broadcast image data is not the up-converted image data, the broadcast image data that was not up-converted from the determination unit and the down-converted image data from the down-converter as the first image data into the second image data having a resolution higher than the broadcast image data that was not up-converted; and the second image converter being configured to convert, when the determination unit determines that the broadcast image data is the up-converted image data, the down-converted image data from the down-converter as the first image data into the second image data, wherein the determination unit provides the broadcast image data to the down-converter when it is determined that the broadcast image data is the up-converted pseudo-high definition image data, and provides the broadcast image data to the down-converter and the first image converter when it is determined that the broadcast image data is not the up-converted image data.

7. The image processing apparatus according to claim 1, wherein the pseudo-high definition image data is generated by up-converting a standard definition NTSC-composite-signal having an aspect ratio different from the high definition image data prior to broadcast.

8. The image processing apparatus according to claim 1, wherein the determination means determines whether the broadcast image data is either the pseudo-high definition image data or the high definition image data based on a comparison between a sum of differences between adjacent pixel values and a threshold value.

9. The image processing apparatus according to claim 1, wherein the determination means determines whether the broadcast image data is either the pseudo-high definition image data or the high definition image data based on colors at edges of the broadcast image data.

10. The image processing apparatus according to claim 1, further comprising:

a tuner that receives the broadcast image data; and
a decoder that decodes the broadcast image data received by the tuner and provides the broadcast image data to the determination means.

* * * * *